(12) United States Patent
Maeda et al.

(10) Patent No.: US 7,251,008 B2
(45) Date of Patent: *Jul. 31, 2007

(54) LIQUID CRYSTAL DEVICE, PROJECTION TYPE DISPLAY AND ELECTRONIC EQUIPMENT

(75) Inventors: Tsuyoshi Maeda, Ryuo-cho (JP); Kinya Ozawa, Suwa (JP); Osamu Okumura, Chino (JP); Eiji Okamoto, Matsumoto (JP); Hirotaka Kawata, Suwa (JP); Toshiharu Matsushima, Suwa (JP); Takumi Seki, Misato-mura (JP); Kimitaka Kamijo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/206,110

(22) Filed: Aug. 18, 2005

(65) Prior Publication Data

US 2005/0275785 A1    Dec. 15, 2005

Related U.S. Application Data

(62) Division of application No. 10/650,783, filed on Aug. 29, 2003, now abandoned, which is a division of application No. 10/086,529, filed on Mar. 4, 2002, now Pat. No. 6,784,966.

(30) Foreign Application Priority Data

Mar. 6, 2001    (JP)    ............................. 2001-062520

(51) Int. Cl.
*G02F 1/1343* (2006.01)
(52) U.S. Cl. ................ 349/141; 349/139; 349/143
(58) Field of Classification Search ........... 349/141, 349/143, 113, 139, 147, 43, 138
See application file for complete search history.

(56) References Cited

U.S. PATENT DOCUMENTS 3,765,747 A    10/1973    Pankratz et al.

(Continued)

FOREIGN PATENT DOCUMENTS

EP    1 172 685 A1    1/2002

(Continued)

*Primary Examiner*—Thoi V. Duong
(74) *Attorney, Agent, or Firm*—Oliff & Berridge, PLC

(57) ABSTRACT

The invention provides a reflection type liquid crystal device, and a projection type display and electronic equipment in which display defects caused by disclination are reduced, minimized or prevented from being produced for a highly fine liquid crystal display with a space between pixels made to be narrow to make it possible to provide a high-contrast and bright display. A liquid crystal device includes a liquid crystal layer sandwiched between a first substrate and a second substrate, and a first electrode and a second electrode formed on a face of the above-described second substrate on a side of the above-described liquid crystal layer. The above-described first electrode and the above-described second electrode are formed so that an electric field substantially parallel to the surface of the substrate with respect to the above-described liquid crystal layer can be applied thereto. The above-described first electrode is formed in a linear shape having a specified line width on the above-described second electrode with a second insulation film interposed therebetween. The above-described second electrode is formed in a rectangular shape, and at least one of the above-described first electrode and the above-described second electrode is a reflecting electrode that causes incident light coming from a direction of the above-described first substrate.

6 Claims, 10 Drawing Sheets

U.S. PATENT DOCUMENTS

| | | |
|---|---|---|
| 4,097,131 A | 6/1978 | Nishiyama |
| 5,519,523 A | 5/1996 | Madokoro et al. |
| 5,706,064 A | 1/1998 | Fukunaga et al. |
| 5,953,148 A | 9/1999 | Moseley et al. |
| 5,990,995 A | 11/1999 | Ebihara et al. |
| 6,067,143 A | 5/2000 | Tomita |
| 6,147,738 A | 11/2000 | Okamoto |
| 6,221,444 B1 | 4/2001 | Okada et al. |
| 6,297,865 B1 | 10/2001 | Matsui et al. |
| 6,327,013 B1 * | 12/2001 | Tombling et al. ........... 349/139 |
| 6,356,331 B1 | 3/2002 | Ono et al. |
| 6,400,435 B2 | 6/2002 | Son et al. |
| 6,411,357 B1 | 6/2002 | Ting et al. |
| 6,523,961 B2 | 2/2003 | Ilkov et al. |
| 6,577,368 B1 | 6/2003 | Yuh et al. |
| 6,630,977 B1 * | 10/2003 | Yamazaki et al. .......... 349/141 |
| 6,650,388 B2 | 11/2003 | Ohta et al. |
| 6,784,966 B2 * | 8/2004 | Maeda et al. ............... 349/141 |
| 2001/0040660 A1 | 11/2001 | Tsuboi et al. |
| 2002/0167631 A1 | 11/2002 | Ishihara et al. |

FOREIGN PATENT DOCUMENTS

| | | |
|---|---|---|
| JP | A 07-134301 | 5/1995 |
| JP | A 10-20304 | 1/1998 |
| JP | A 10-48826 | 6/1998 |
| JP | A 10-333171 | 12/1998 |
| JP | A-11-125835 | 5/1999 |
| JP | A-11-202356 | 7/1999 |
| JP | A 11-237648 | 8/1999 |
| JP | A-11-316383 | 11/1999 |
| JP | A 2000-29072 | 1/2000 |
| JP | A 2000-194015 | 7/2000 |
| JP | A 2001-083540 | 3/2001 |
| JP | A 2001-142093 | 5/2001 |
| JP | A 2001-174818 | 6/2001 |
| WO | WO 01/59514 A1 | 8/2001 |

* cited by examiner (a)

(b)

(a)

(b)

(a)

(b)

(a)

(b)

(c)

LIQUID CRYSTAL DEVICE, PROJECTION TYPE DISPLAY AND ELECTRONIC EQUIPMENT

This is a Division of application Ser. No. 10/650,783, filed Aug. 29, 2003 now abandoned, which is a Division of application Ser. No. 10/086,529 filed Mar. 4, 2002 now U.S. Pat. No. 6,784,966. The entire disclosure of the prior application is hereby incorporated by reference herein in its entirety.

BACKGROUND OF THE INVENTION

1. Field of Invention

The present invention relates to a liquid crystal device, and more particularly to a liquid crystal device that utilizes a transverse electric field. The invention also relates to a projection type display system and electronic equipment using the liquid crystal device.

2. Description of Related Art

Liquid crystal display systems have long been the subject of increasing demand as not only a direct-vision type, but also a projection type display element of an apparatus, such as a projection television. When using the liquid crystal display system as the projection type system, an increase in magnification with a previous pixel number causes image roughness to become remarkable. Thus, in order to obtain a fine image even with a high magnification, it becomes necessary to increase the pixel number. However, an increase in the pixel number of the liquid crystal display system, in particular in an active matrix type liquid crystal display system, relatively increases an area occupied by a portion other than that of the pixel, for example, a portion of an interconnection or a thin film transistor (active element). This causes an increase in an area of a black matrix covering the above portion to reduce a pixel opening area contributing to the display, which causes a problem of reducing an aperture ratio as a display system.

The reduction in the aperture ratio darkens the image to degrade an image grade as a liquid crystal display system.

Thus, in order to reduce or prevent the reduction in the aperture ratio as much as possible due to such an increase in the pixel number, in some of the projection type display systems, a transmission type liquid crystal panel is being shifted to a reflection type liquid crystal panel. By providing the liquid crystal panel as a reflection type, it becomes possible to form interconnection portions, such as scanning lines and signal lines, under a reflection electrode to allow an aperture ratio of a pixel to be increased.

However, even with advent of such various kinds of projection type display systems, in a high resolution liquid crystal panel, a distance between pixels, that is, a distance between pixel electrodes, becomes small. Thus, the high resolution liquid crystal panel has a problem in that an a pixel is affected by a transverse electric field from peripheries of other adjacent pixel electrodes, which causes disclination of the liquid crystal to produce defects in a display region. A detailed explanation of the defects in the display region is provided below.

In a current liquid crystal panel for a projector with a highly fine structure, a rectangular pixel electrode is finely prepared with a width of the order of 20 μm. A plurality of such pixel electrodes are arranged in matrix-like in the display region. In a liquid crystal panel with such a highly fine structure to which a reflection type structure is employed, a structure is employed in which switching elements formed on a substrate are covered with an insulation layer on which pixel electrodes are arranged without producing any gap. This enables a distance between pixel electrodes to be narrowed down to 1 μm or less.

In a highly fine liquid crystal panel having a structure with an interelectrode space of the pixel electrode thus narrowed, a strong transverse electric field will act on a liquid crystal that exists at a boundary portion between adjacent pixel electrodes. The liquid crystal, which is originally to be controlled between a common electrode and pixel electrodes formed on respective inner surfaces of opposing substrates, is affected by the transverse electric field to have a high possibility of being orientated in a different direction. Namely, in the liquid crystal in a region where the orientation of the liquid crystal is to be controlled by the pixel electrode, a part of liquid crystal is made to be directed in directions that are subtly different from those of the other liquid crystal. This causes a problem of producing linear display defects, called disclination lines, at a boundary region with the liquid crystals with the orientating directions being subtly different. An actual measurement of widths of the linear display defects in such a kind of liquid crystal display system has revealed that the width is of the order of about 3 μm in average.

The problem of the display defects due to such a transverse electric field occurs not only in the projection type display system, but also in a highly fine direct-vision type liquid crystal device.

With an object of eliminating such display defects, liquid crystal devices were studied which are proposed in claim 50 to claim 65 in Japanese Patent Laid-Open No. 202356/1999. A related art liquid crystal device is disclosed wherein the liquid crystal is controlled by a so-called longitudinal electric field produced between a pixel electrode and a common electrode, respectively formed on inner faces of a pair of substrates. Compared with this, in each of the proposed liquid crystal devices, a transverse electric field, produced when a space between the pixels becomes narrow, is positively utilized with an intention of realizing a liquid crystal system without display defect. However, the liquid crystal devices proposed in Japanese Patent Laid-Open No. 202356/1999 relate to transmission type liquid crystal devices, whose respective conditions and structures can only be applied to a transmission type liquid crystal device.

SUMMARY OF THE INVENTION

The present invention addresses the above-described problems, and an object of the invention is to provide a liquid crystal device, a projection type display system, and electronic equipment in which display defects caused by disclination are reduced, minimized or prevented from being produced for a highly fine liquid crystal display system with a space between pixels made to become narrow to make it possible to provide a high-contrast and bright display.

In order to address the above-described problems, measures taken by the invention are as follows.

A liquid crystal device in accordance with a first aspect includes a liquid crystal layer disposed between a first substrate and a second substrate, and a first electrode and a second electrode formed on a face of the above-described second substrate on a side of the above-described liquid crystal layer. The above-described first electrode and the above-described second electrode are constituted so that they can apply an electric field substantially parallel to the surface of the substrate with respect to the above-described liquid crystal layer. The above-described first electrode is formed in a linear shape having a specified line width on the above-described second electrode through a second insulation film. The above-described second electrode is formed in a rectangular shape, and at least one of the above-described first electrode and the above-described second electrode is a reflecting electrode that makes light reflected which is made incident from a side of the above-described first substrate.

Display defects, such as disclination caused by a transverse electric field due to adjacent pixels, can be reduced, minimized or eliminated to realize a bright and high-contrast reflection type liquid crystal display. With the first electrode provided as a reflection electrode, light incident from the first substrate side on the first electrode can be reflected toward the first substrate side again. In this case, the first electrode with a thicker width can reflect more incident light. Moreover, a number of thin linear first electrodes can be formed therefor. With the second electrode provided as a reflection electrode, light incident from the first substrate side on the second electrode can be reflected toward the first substrate side again. In this case, the first electrode may be a transparent electrode, such as ITO. Furthermore, with both of the first electrode and the second electrode provided as reflection electrodes, light incident from the first substrate side on a pixel can be reflected toward the first substrate side again. In this case, with another first electrode further formed between pixels adjacent to each other, a portion between the pixels can be effectively utilized for the display.

A liquid crystal display in accordance with a second aspect includes a liquid crystal device including a liquid crystal layer disposed between a first substrate and a second substrate, and a scanning signal line, an image signal line, a first electrode, a second electrode and an active element formed on a face of the above-described second substrate on a side of the above-described liquid crystal layer. The above-described first electrode and the above-described second electrode are constituted so that they can apply an electric field substantially parallel to the surface of the substrate with respect to the above-described liquid crystal layer. The above-described second electrode is formed over almost all of a display area of the liquid crystal device through a first insulation film so as to cover the above-described scanning signal line, the above-described image signal line and the above-described active element, and has an opening. The above-described first electrode is formed in each of pixels in a linear shape having a specified line width on the above-described second electrode through a second insulation film. The above-described first electrode and the above-described active element are connected through the opening of the above-described second electrode, and at least one of the above-described first electrode and the above-described second electrode is a reflecting electrode that makes light reflected which is made incident from a side of the above-described first substrate.

Display defects, such as disclination caused by a transverse electric field due to adjacent pixels, can be reduced, minimized or eliminated to realize a bright and high-contrast reflection type liquid crystal display. Since the scanning signal line, the image signal line and the active element can be arranged under the first electrode and the second electrode, a reflection type liquid crystal device can be realized with a high aperture ratio. With the first electrode provided as a reflection electrode, light incident from the first substrate side on the first electrode can be reflected toward the first substrate side again. In this case, the first electrode with a thicker width can reflect more incident light. Moreover, a number of thin linear first electrodes can be formed therefor. With the second electrode provided as a reflection electrode, light incident from the first substrate side on the second electrode can be reflected toward the first substrate side again. In this case, the first electrode may be a transparent electrode, such as ITO. The second electrode, being formed over approximately the whole display area, also plays a role of a shading film for the active element. Moreover, the second electrode is also formed between neighboring pixels. This allows realization of a reflection type liquid crystal device with an extremely high aperture ratio.

Furthermore, with both of the first electrode and the second electrode provided as reflection electrodes, light incident from the first substrate side on a pixel can be reflected toward the first substrate side again. A TFT (Thin Film Transistor) element, a MIM (Metal Insulator Metal) element, a TFD (Thin Film Diode) element, and the like can be used as the active element.

The liquid crystal device in accordance with a third aspect is provided such that, wherein the line width and an interelectrode space of the above-described first electrode are W1 and L1, respectively, L1/W1 is $4<L1/W1 \leq 40$.

The first electrodes are formed to have the interelectrode space of the first electrode taken to be sufficiently wider than the line width of the first electrode. Therefore, a region of the liquid crystal positioned on the first electrode and exhibits insufficient response to the electric field can be made to be as small as possible, which allows realization of a brighter and high-contrast reflection type liquid crystal display.

The liquid crystal device in accordance with a fourth aspect is provided such that, wherein the line width and an interelectrode space of the above-described first electrode are W1 and L1, respectively, L1/W1 is $0.005 \leq L1/W1 < 0.2$.

The first electrodes are formed with the interelectrode space of the first electrode taken to be sufficiently narrower than the line width of the first electrode. Therefore, most of incident light from the first substrate side can be reflected by the first electrode, which can inhibit a phenomenon of the incident light entering around onto a section of the active element as much as possible. This eliminates a faulty operation of the active element due to light leakage. The interelectrode space of the first electrode made excessively narrowed causes the transverse electric field to be hardly generated between the first electrode and the second electrode. Therefore, the range according to the invention is preferable.

The liquid crystal device in accordance with a fifth aspect is provided such that, wherein an interelectrode space of the above-described first electrode is L1, L1 is $0.1\ \mu m \leq L1 < 1\ \mu m$.

The first electrodes are formed with the interelectrode space thereof taken to be narrow. Therefore, most of incident light from the first substrate side can be reflected by the first electrode, which can inhibit a phenomenon of incident light entering around onto a section of the active element as much as possible. This eliminates a faulty operation of the active element due to light leakage. The interelectrode space of the first electrode made excessively narrowed causes the transverse electric field to be hardly generated between the first electrode and the second electrode. Therefore, the range according to the invention is preferable.

The liquid crystal device in accordance with a sixth aspect is provided such that, wherein an interelectrode space of the above-described first electrode is L1, L1 is $8\ \mu m < L1 \leq 25\ \mu m$.

The first electrodes are formed with the interelectrode space of the first electrode taken to be sufficiently wide. Therefore, a region of the liquid crystal positioned on the first electrode and exhibits insufficient response to the electric field can be made to be as small as possible, which allows realization of a brighter and high-contrast reflection type liquid crystal display.

The liquid crystal device in accordance with a seventh aspect is provided such that, in one pixel, there exist a plurality of the openings in the above-described second electrode, through each of which openings a plurality of the above-described linear first electrodes are connected to the same one active element.

Connections to a plurality of the linear first electrodes can be provided from one active element in one pixel. Another way of connecting a plurality of the linear first electrode formed in one pixel to one active element is provided, in which a linear electrode is provided in a direction orthogonal to the longitudinal direction of the linear first electrode for short-circuiting each of the linear first electrodes. This way, however, when employed, causes the transverse electric field between the first electrode and the second electrode to be produced in being non-uniform to make it impossible to realize a bright and high-contrast reflection type liquid crystal display. Thus, the constitution as that according to the invention is very effective.

The liquid crystal device in accordance with an eighth aspect is provided such that the above-described first electrode also serves as a shading film.

Of incident light from the first substrate side, the light incident on the section of the active element can be reflected by the first electrode, which can inhibit a phenomenon of the incident light entering around onto the section of the active element as much as possible. This eliminates a faulty operation of the active element due to light leakage. Moreover, by making the shading film, formed in a portion between pixels in a related art liquid crystal device, as being the first electrode, the portion between the pixels, which do not contribute to the display, can be effectively utilized for the reflection type display. This allows realization of a bright and high-contrast reflection type liquid crystal display.

The liquid crystal device in accordance with a ninth aspect is provided such that the above-described second electrode also serves as a shading film.

Of incident light from the first substrate side, the light incident on the active element can be reflected by the second electrode, which can inhibit a phenomenon of incident light entering around onto a section of the active elements as much as possible. This eliminates a faulty operation of the active element due to light leakage. Moreover, by making the shading film, formed in a portion between pixels in a related art liquid crystal device, as being the second electrode, the portion between the pixels, which did not contribute to the display, can be effectively utilized for the reflection type display. This allows realization of a bright and high-contrast reflection type liquid crystal display.

The liquid crystal device in accordance with a tenth aspect is provided such that a longitudinal direction of the above-described linear first electrode is neither in parallel with nor perpendicular to any of four sides of a liquid crystal panel.

The liquid crystal can be orientated (initial orientation when no voltage is applied) in the longitudinal direction of the first substrate and the second substrate or in the direction orthogonal to this. This allows polarized light, with a transmission axis thereof in the longitudinal direction of the first substrate and the second substrate or in the direction orthogonal thereto, to be incident on the liquid crystal device. For example, a polarizing beam splitter (PBS) used for the projection type display system structurally restricts the polarized direction of the outputted polarized light, which becomes very convenient for the liquid device according to the invention.

The liquid crystal device in accordance with an eleventh aspect is provided such that a shape of each of the pixels is a parallelogram and each angle thereof is not a right angle.

The liquid crystal can be orientated (initial orientation when no voltage is applied) in the longitudinal direction of the first substrate and the second substrate or in the direction orthogonal to this. This allows polarized light, with a transmission axis thereof in the longitudinal direction of the first substrate and the second substrate or in the direction orthogonal thereto, to be incident on the liquid crystal device. For example, a polarizing beam splitter (PBS) used for the projection type display system structurally restricts the polarized direction of the outputted polarized light, which becomes very convenient for the liquid device according to the invention.

The liquid crystal device in accordance with a twelfth aspect is provided such that, wherein an angle formed between a longitudinal direction of the above-described linear first electrode and a longitudinal direction of the liquid crystal panel is $\beta$, $\beta$ is 3 degrees $\leq \beta \leq 87$ degrees.

The liquid crystal can be orientated (initial orientation when no voltage is applied) in the longitudinal direction of the first substrate and the second substrate or in the direction orthogonal to this. This allows polarized light, with a transmission axis thereof in the longitudinal direction of the first substrate and the second substrate or in the direction orthogonal thereto, to be incident on the liquid crystal device. For example, a polarizing beam splitter (PBS) used for the projection type display system structurally restricts the polarized direction of the outputted polarized light, which becomes very convenient for the liquid device according to the invention. In addition, a more preferable range for $\beta$ is 5 degrees $\leq \beta \leq 25$ degrees, or 65 degrees $\leq \beta \leq 85$ degrees.

The liquid crystal device in accordance with a thirteenth aspect is provided such that, in pixels adjacent to each other, a longitudinal direction of at least one linear first electrode is in nonparallel with a longitudinal direction of a linear first electrode of the adjacent pixel.

There can be realized a liquid crystal device with small dependence on viewing angle of liquid crystal. For example, when white is displayed on the whole screen of a liquid crystal display system, the liquid crystal is orientated in approximately the same way by a transverse electric field in any part. Observation of the approximately uniformly orientated state of the liquid crystal through a polarizing plate shows presence of viewing angle dependent characteristic like in a related art liquid crystal device. Thus, as in the liquid crystal device according to the invention, electrodes with longitudinal directions thereof made in nonparallel with each other in adjacent pixels provide orientated states (orientated directions) different from each other in respective pixels. This can realize a liquid crystal device with a small dependence on viewing angle.

The liquid crystal device in accordance with a fourteenth aspect is provided such that a shape of the above-described linear first electrode is doglegged.

There can be realized a liquid crystal device with small dependence on viewing angle of liquid crystal. By forming an electrode in one pixel in a doglegged shape, transverse electric fields in two directions are made to exist in one pixel. This can produce two orientated states of the liquid crystal in one pixel to realize a liquid crystal device with small dependence on viewing angle of liquid crystal. Furthermore, the liquid crystal can be orientated (initial orientation when no voltage is applied) in the longitudinal direction of the first substrate and the second substrate or in the direction orthogonal to this. This allows polarized light, with a transmission axis thereof in the longitudinal direction of the first substrate and the second substrate or in the direction orthogonal thereto, to be incident on the liquid crystal device. For example, a polarizing beam splitter (PBS) used for the projection type display system structurally restricts the polarized direction of the outputted polarized light, which becomes very convenient for the liquid device according to the invention.

The liquid crystal device in accordance with a fifteenth aspect is provided such that the above-described first insulation film has a planarization function so that the above-described second electrode provides a mirror surface.

The first insulation film buries the scanning line, the image signal line, and the active element arranged under the second electrode to allow the surface of the first insulation film to be free from influence of level difference among their surfaces and planarized, which makes it possible to provide the second electrode in a state of a mirror surface. This can reflect the incident light from the first substrate side toward the first substrate side again with high reflectance. Moreover, adverse effect of the level difference among the scanning line, the image signal line and the active element on the liquid crystal can be also reduced.

The liquid crystal device in accordance with a sixteenth aspect is provided such that the above-described first electrode is a pixel electrode and the above-described second electrode is a common electrode.

The first electrode can be provided as a pixel electrode, and the second electrode can be a common electrode. Thus, by inputting a liquid crystal driving signal that is approximately the same as the related art one, a bright and high-contrast reflection type liquid crystal display can be realized.

The liquid crystal device in accordance with a seventeenth aspect is provided such that, wherein a thickness of the above-described first insulation film is D1, D1 is 0.01 µm≦D1≦5 µm.

The scanning line, the image signal line and the active element can be prevented from short-circuiting with the second electrode. Moreover, unevenness of the surface of the first insulation film caused by the scanning line, the image signal line and the active element can be reduced, minimized or eliminated to provide a planarized surface. With a thickness of the first insulation film equal to or more than 0.01 µm, an influence of electric potentials of the scanning line, the image signal line and the active element on the second electrode (common electrode) can be made almost negligible. In addition, a more preferable range for D1 is 1 µm≦D1≦3 µm.

The liquid crystal device in accordance with an eighteenth aspect is provided such that, wherein a thickness of the above-described second insulation film is D2, D2 is 0.01 µm≦D2≦5 µm.

The first electrode and the second electrode can be prevented from short-circuiting. Moreover, the transverse electric field produced between the first electrode and the second electrode can be effectively applied to the liquid crystal layer. In addition, a more preferable range for D2 is 0.1 µm≦D2≦2 µm.

The liquid crystal device in accordance with a nineteenth aspect is provided such that one of the above-described first insulation film and the above-described second insulation film includes SiOx or SiNx.

The first insulation film and the second insulation film can be formed relatively easily and less expensively. Moreover, realization of high insulation is possible. Because of its relatively high transmittance, SiOx or SiNx can be effectively used as the first insulation film formed on the second electrode. In this way, high reflectance can be obtained with the second electrode.

The liquid crystal device in accordance with a twentieth aspect is provided such that transmittance of the above-described second insulation film in a visible light region is equal to or more than 80%.

According to the measure, high reflectance can be realized with the second electrode. Of the light incident from the first substrate side, that which reaches the second insulation film and is reflected back is to pass through the second insulation film two times. The second insulation film with transmittance thereof becoming less than 80% absorbs about 40 to 50% of incident light to make it impossible to realize a bright reflection type liquid crystal display.

The liquid crystal device in accordance with a twenty-first aspect is provided such that the above-described second insulation film is a color filter.

The light reflected by the second electrode is colored to make it possible to perform a colored reflection type display.

The liquid crystal device in accordance with the twenty-second aspect is provided such that, wherein a thickness of the above-described liquid crystal layer be d and refractive index anisotropy of the liquid crystal are Δn, Δn×d is 0.1 µm≦Δn×d<0.2 µm.

Realization of a bright and high-contrast reflection type liquid crystal display becomes possible. Incident light from the first substrate side, after passing through the liquid crystal layer, is reflected by the first electrode or the second electrode to pass through the liquid crystal layer again. That is, the light is to pass through the liquid crystal layer two times. Thus, retardation represented by a product of the thickness of the liquid crystal layer and refractive index anisotropy thereof becomes approximately half that in a transmission type liquid crystal display system.

The liquid crystal device in accordance with a twenty-third aspect is provided such that, in each of the above-described first substrate and the above-described second substrate, an orientation film is formed on a face in contact with the above-described liquid crystal layer, and, wherein an angle which liquid crystal molecules form with a substrate face (pretilt angle) is θp, θp is 10 degrees<θp≦90 degrees.

Display defects due to unnecessary electric field component of electric field produced between the first electrode and the second electrode can be reduced, minimized or eliminated, the component being produced in the normal direction to the first substrate and the second substrate.

The liquid crystal device in accordance with a twenty-fourth aspect is provided such that, wherein an angle formed between an axis of orientation of the orientation film formed on an inner face of the above-described first substrate and an axis of orientation of the orientation film formed on an inner face of the above-described second substrate is α, α is 0 degrees≦α<180 degrees.

The liquid crystals in the liquid crystal layer can be orientated in being twisted between the first substrate and the second substrate. This allows the liquid crystal to be effectively controlled by the transverse electric field produced between the first electrode and the second electrode. Moreover, by making α as being approximately α=0, it can be realized that liquid crystal molecules positioned at the central part of the liquid crystal layer are made to have a tilt angle to the substrate surface made approximately zero degrees.

The liquid crystal device in accordance with a twenty-fifth aspect is provided such that the above-described liquid crystal layer has negative dielectric anisotropy and includes liquid crystal material having cyano radical.

The use of the liquid crystal having negative dielectric anisotropy can inhibit display defects due to the unnecessary electric field component of electric field produced between the first electrode and the second electrode, which component is produced in the normal direction to the first substrate and the second substrate. In addition, the inclusion of the liquid crystal material having cyano radical provides large dielectric anisotropy to make it possible to drive the liquid crystal with a low voltage. This makes possible realization of a liquid crystal device with low electric power consumption.

The liquid crystal device in accordance with a twenty-sixth aspect is provided such that the above-described liquid crystal layer includes liquid crystal material having chiral.

The liquid crystal can be effectively operated (driven) by the transverse electric field produced between the first electrode and the second electrode. Moreover, fast response becomes possible. With chiral mixed in the liquid crystal, the liquid crystal increases elastic energy level about twist. Since the liquid crystal device controls the liquid crystal so that alignment of the liquid crystal molecules is twisted between the first substrate and the second substrate by the transverse electric field, it is very effective to initially give the liquid crystal material twist power.

The liquid crystal device in accordance with a twenty-seventh aspect is provided such that the above-described orientation film includes SiOx.

Uniform orientation of the liquid crystal can be obtained without rubbing the first substrate and the second substrate. Being rubbing free causes generation of no static electricity and production of no dust. The orientation film of SiOx can be realized by oblique angle deposition in vacuum. The SiOx is preferably deposited with oblique angles of approximately from 60 degrees to 85 degrees from the direction of the normal to the substrate.

The liquid crystal device in accordance with a twenty-eighth aspect is provided such that the above-described second substrate is a silicon (Si) substrate.

An active element with high mobility can be provided to allow realization of a high-speed and high-contrast reflection type liquid crystal display.

The liquid crystal device in accordance with a twenty-ninth aspect is provided such that a transparent electrode at a constant potential is provided on a face of the above-described first substrate which face is different from the face on the above-described liquid crystal layer.

There can be realized a liquid crystal device for which an influence of static electricity is reduced, minimized or prevented.

The first substrate, having no electrode on the face in contact with the liquid crystal layer, is liable to be damaged by static electricity. Thus, a transparent electrode at a constant potential is formed on a face of the first substrate which face is different from the face on the liquid crystal layer. This can inhibit the influence of the static electricity.

The liquid crystal device in accordance with a thirtieth aspect is provided such that the above-described transparent electrode is at the zero potential.

Existing electric potential can be used to make it possible to relatively simply take a measure for preventing the static electricity.

The liquid crystal device in accordance with a thirty-first aspect is provided such that the above-described transparent electrode includes ITO.

A way to prevent static electricity can be taken without degrading the reflection type liquid crystal display. The ITO has high transmittance and is easily manufactured.

The liquid crystal device in accordance with a thirty-second aspect is provided such that a pixel pitch is equal to or less than 30 μm.

With a highly fine liquid crystal device with a pixel pitch equal to or less than 30 μm, realization of a bright and high-contrast reflection type liquid crystal display is made possible. In addition, for a liquid crystal device having a pixel pitch equal to or less than 20 μm, the invention is more effective.

The liquid crystal device in accordance with a thirty-third aspect is provided such that, wherein the interelectrode space of the above-described first electrode and the thickness of the above-described second insulation film are L1 and D2, respectively, L1/D2 is $5 \leq L1/D2 \leq 30$.

A transverse electric field can be effectively produced between the first electrode and the second electrode. This makes it possible to drive the liquid crystal with a low voltage.

The projection type liquid crystal display system in accordance with a thirty-fourth aspect includes the liquid crystal device of any of the first to thirty-third aspects.

A bright and high-contrast projection type display system can be realized.

The projection type liquid crystal display system in accordance with a thirty-fifth aspect includes a light source, a light modulation device modulating light from the above-described light source, and a projection lens projecting the light modulated by the above-described light modulating device, and using the liquid crystal device in accordance with any of the first to thirty-third aspects as the above-described light modulation device.

A bright and high-contrast projection type display system can be realized.

The liquid crystal device in accordance with a thirty-sixth aspect is provided such that a polarizing plate is arranged on the above-described first substrate on a side different from a side on the above-described liquid crystal layer, the above-described liquid crystal layer is subjected to uniaxial orientation, a direction of the above-described uniaxial orientation and a transmission axis of the above-described polarizing plate forms an angle of approximately 45 degrees, and a phase difference caused in the above-described liquid crystal layer is approximately equal to a quarter-wavelength.

A bright and high-contrast direct-vision reflection type display system can be realized.

The liquid crystal device in accordance with a thirty-seventh aspect is provided such that at least one compensator and one polarizing plate are arranged in order on the above-described first substrate on a side different from a side on the above-described liquid crystal layer, and a total phase difference caused in the above-described liquid crystal layer and the above-described compensator is approximately equal to a quarter-wavelength to light in a visible light region.

A bright and high-contrast direct-vision reflection type display system can be realized.

The liquid crystal device in accordance with a thirty-eighth aspect is provided such that at least one compensator and one polarizing plate are arranged in order on the above-described first substrate on a side different from a side on the above-described liquid crystal layer, and a phase difference caused in the above-described compensator is approximately equal to a quarter-wavelength to light in a visible light region.

A bright and high-contrast direct-vision reflection type display system can be realized.

The liquid crystal device in accordance with a thirty-ninth aspect is provided such that a color filter corresponding to each of pixels is formed on a face of the above-described first substrate on the above-described liquid crystal side.

A bright and high-contrast direct-vision reflection type color display system can be realized.

The electronic equipment in accordance with a fortieth aspect mounts the liquid crystal device in accordance with any of the thirty-sixth to thirty-ninth aspects.

Electronic equipment with high visibility mounting a bright and high-contrast direct-vision type display system can be realized.

DETAILED DESCRIPTION OF PREFERRED EMBODIMENTS

The invention will be explained in detail with reference to attached drawings.

First Embodiment

Figure 1:
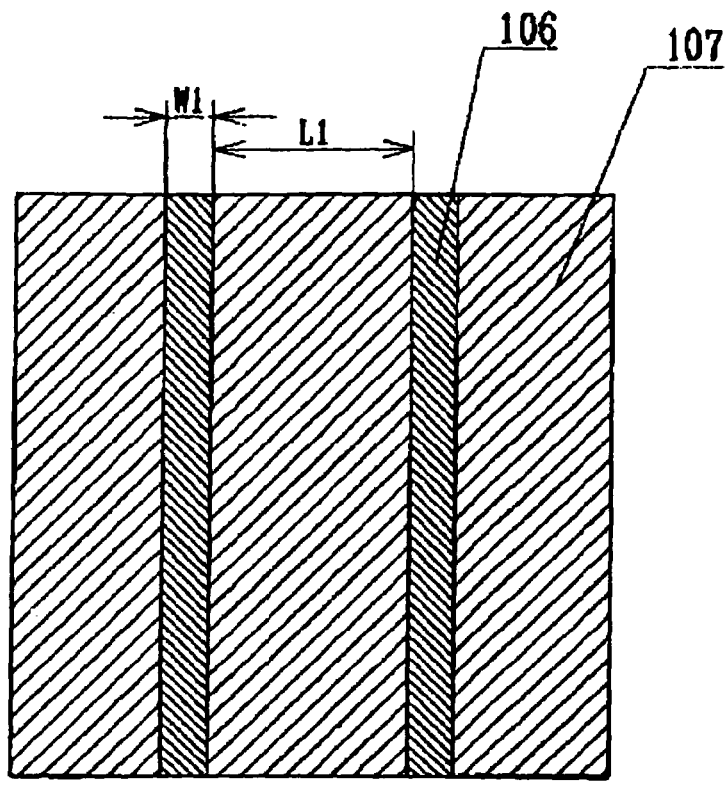
FIGS. 1(a) and 1(b) are schematics showing a structure of a first embodiment of a liquid crystal device according to the invention.
Figure 1:
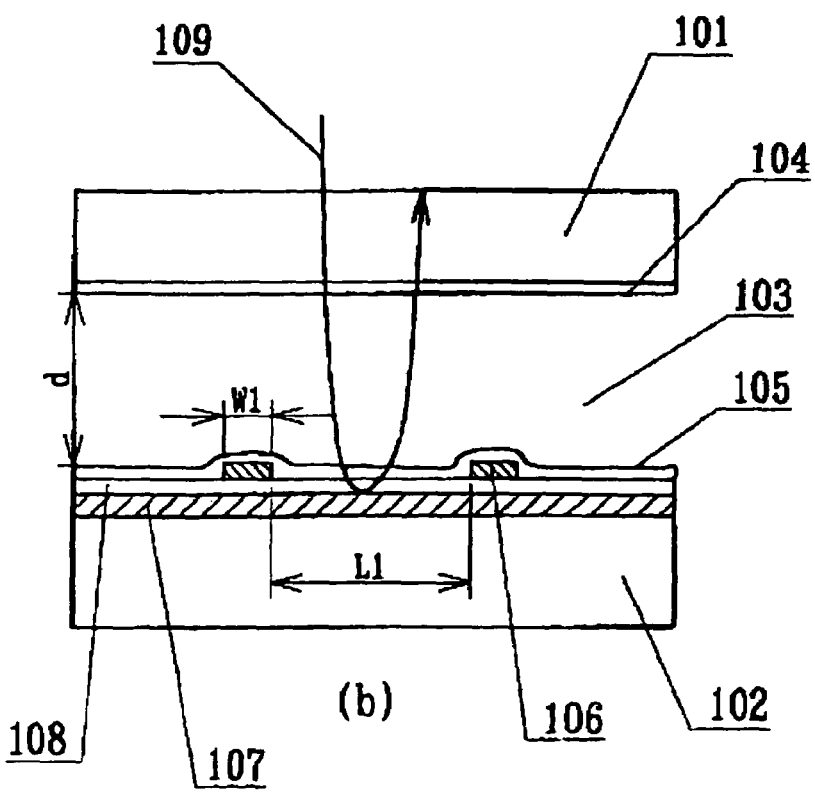

FIGS. 1(a) and 1(b) are schematics showing a structure of a first embodiment of a liquid crystal device according to the invention. FIG. 1 (a) is a front view of one pixel, and FIG. 1 (b) a cross sectional view thereof. A structure is provided in which a liquid crystal layer 103 is disposed between two substrates, an upper substrate 101 and a lower substrate 102. The upper substrate 101 has an alignment layer 104 formed on the inner face thereof. On the inner side of the lower substrate 102, there are formed a second electrode 107, an insulation film 108 including SiOx, a first electrode 106 and an alignment layer 105.

The first electrode 106 is a linear transparent electrode and the second electrode 107 is a rectangular reflecting electrode. The second electrode 107 reflects light 109 incident from the upper substrate 101 side. The liquid crystal layer 103 is controlled by an external driving circuit with an electric field produced due to an electric potential difference between the first electrode 106 and the second electrode 107. The reflection type liquid crystal device actively produces a transverse electric field, previously regarded as a cause of display defects, to control the liquid crystal. Thus, there is no display defect, such as disclination due to the transverse electric field that occurs in such cases as in a related art device in which a longitudinal electric field is applied between upper and lower substrates. This enables realization of a bright and high-contrast reflection type liquid crystal display.

In the embodiment, the second electrode 107 is provided as a reflecting electrode, and the first electrode 106 is provided as a transparent electrode including ITO. The first electrode 106, however, may be also provided as a reflecting electrode. For the reflecting electrode, an alloy can be used whose principal component is Al (aluminum), Ag (silver), Cr (chromium), Ta (tantalum), Ni (nickel), Au (gold), Cu (copper), Pt (platinum) or the like. The use of alloys of these metals can realize a reflection type liquid crystal device with high reflectance.

In the embodiment, SiOx is used for the insulation film 108. This, however, may be transparent resin, such as SiNx or acrylic resin. These materials can realize high insulation.

For the insulation film 108 in the embodiment, a material having transmittance equal to or greater than 80% is preferably used. From this point, SiOx, SiNx or acrylic resin is an excellent material. Moreover, with the insulation film 108 being a color filter, light reflected by the second electrode 107 is colored to make it possible to provide a reflection type colored display. For providing a display in full color, color filters of red (R), green (G), and blue (B) are preferably formed in correspondence with respective pixels.

In the embodiment, nematic liquid crystal material exhibiting negative dielectric anisotropy can be used. This makes it possible to reduce, minimize or eliminate the display defects due to unnecessary longitudinal component of an electric field produced in the direction of the normal to the upper substrate 101 and the lower substrate 102, of the electric field produced between the first electrode 106 and the second electrode 107.

In addition, the use of liquid crystal material including the liquid crystal having cyano radical provides large dielectric anisotropy to make it possible to control the liquid crystal with a low voltage. This enables realization of a liquid crystal device with low electric power consumption. Furthermore, by mixing chiral in liquid crystal material, fast response becomes possible.

In the embodiment, polyimide organic films are subjected to rubbing to be used for the alignment layers 104 and 105. However, an alignment layer for which SiOx is deposited by oblique angle deposition in vacuum can be used.

In this way, generation of no static electricity and production of no dust are caused to greatly enhance manufacturing yield.

As shown in FIG. 1, wherein the line width of the first electrode 106 is W1 and an interelectrode space of the first electrode 106 is L1, when a plurality of the first electrodes 106 are arranged with a plurality of interelectrode spaces, there is no necessity of making all of the widths W1 and all of the interelectrode spaces L1 respectively equal in one pixel.

Second Embodiment

Figure 2:
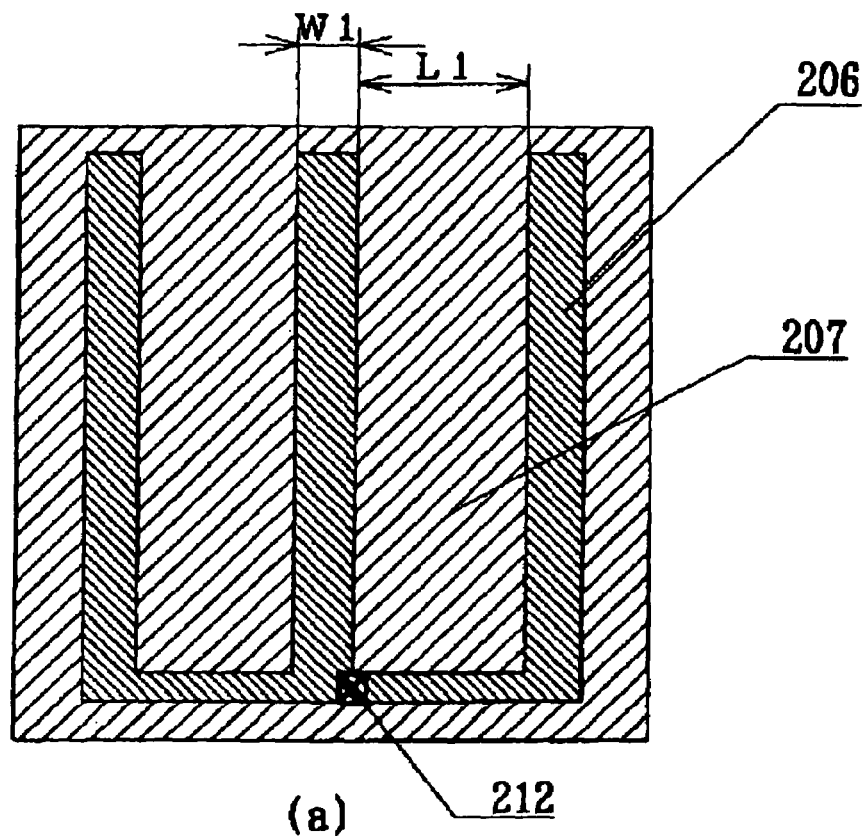
FIGS. 2(a) and 2(b) are schematics showing a structure of a second embodiment of a liquid crystal device according to the invention.
Figure 2:
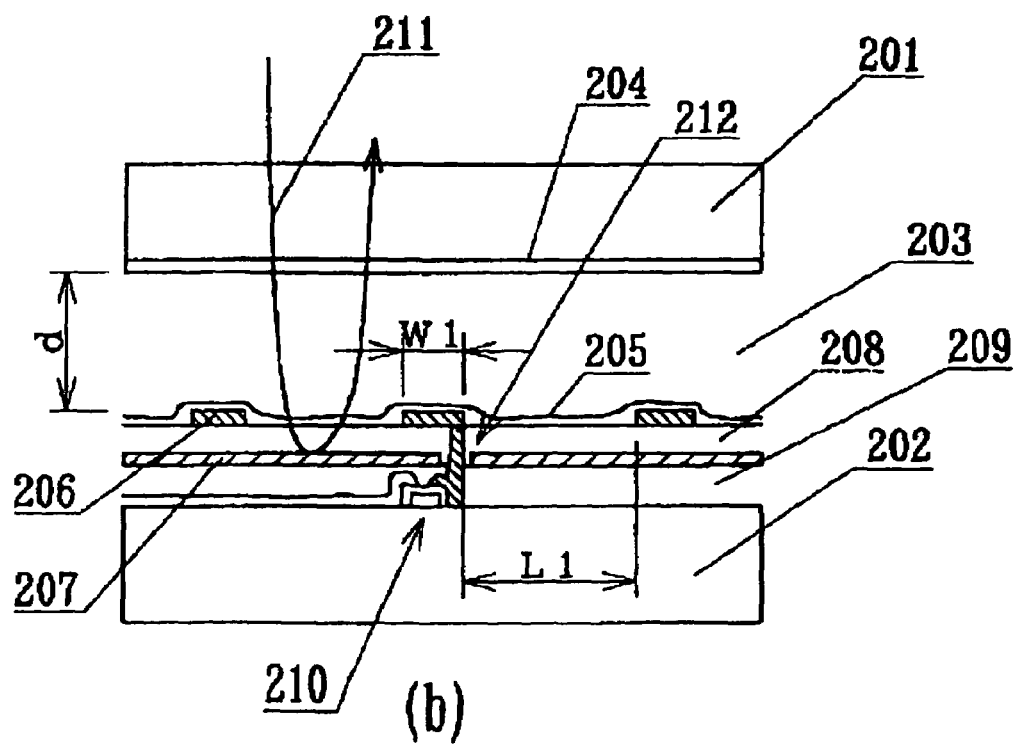

FIGS. 2(a) and 2(b) are schematics showing a structure of a second embodiment of a liquid crystal device according to the invention. FIG. 2 (a) is a front view of one pixel, and FIG. 2 (b) is a cross sectional view thereof. A structure is provided in which a liquid crystal layer 203 is disposed between two substrates, an upper substrate 201 and a lower substrate 202. The upper substrate 201 has an alignment layer 204 formed on the inner face thereof. On the inner side of the lower substrate 202, there are formed a scanning signal line, an image signal line and a TFT element 210, over which there are further formed a first insulation film 209, a common electrode 207, a second insulation film 208, a pixel electrode 206, and an alignment layer 205 in order. In the common electrode 207, there is provided an opening (contact hole) 212 for making the TFT element 210 and the pixel electrode 206 to be in contact with each other. The pixel electrode 206 is a linear transparent electrode and the common electrode 207 is a reflecting electrode that is formed over substantially the whole display area of a liquid crystal panel (formed across pixels adjacent to one another). The common electrode 207 reflects light 211 incident from the upper substrate 201 side. The liquid crystal layer 203 is controlled by an external driving circuit with an electric field produced due to an electric potential difference between the pixel electrode 206 and the common electrode 207. The reflection type liquid crystal device actively produces a transverse electric field, previously regarded as a cause of display defects, to control the liquid crystal. Thus, there is no display defect, such as disclination due to the transverse electric field that occurs in such cases as in a related art device in which a longitudinal electric field is applied between upper and lower substrates. This enables realization of a bright and high-contrast reflection type liquid crystal display.

In the embodiment, the common electrode 207 is provided as a reflecting electrode, and the pixel electrode 206 is provided as a transparent electrode including ITO. The pixel electrode 206, however, may be also provided as a reflecting electrode. The common electrode 207, being formed over substantially the whole display area, also plays a role of a shading film for the TFT element 210. This makes it possible to reduce, minimize or eliminate faulty operation of the TFT element 210 due to light leakage. Moreover, by making the shading film, formed in a portion between pixels in a related art liquid crystal device, as being the common electrode 207, the portion between the pixels, which does not contribute to the display, can be effectively made use of for the reflection type display. This enables realization of a bright and high-contrast reflection type liquid crystal display.

The first insulation film 209, being formed with a specified thickness, buries the scanning line, the image signal line, and the TFT element 210 arranged under the common electrode 207 to allow the surface of the first insulation film 209 to be free from influence of level difference among their surfaces and leveled, which makes it possible to provide the common electrode 207 in a state of a mirror surface. This can reflect the incident light from the upper substrate 201 side toward the upper substrate 201 side again with high reflectance. Moreover, the level difference among the scanning line, the image signal line and the TFT element 210 often exerts adverse effect on the orientation of the liquid crystal 203. However, the first insulation film 209, being provided with a function of a leveling layer, could reduce the adverse effect.

In the embodiment, a Silicon (Si) substrate is used for the lower substrate 202. This makes it possible to provide the TFT element 210 with high mobility to allow realization of a high-speed and high-contrast reflection type liquid crystal display.

Third Embodiment

In the reflection type liquid crystal device shown in FIG. 2, an electrode width of the pixel electrode 206 and an interelectrode space of the pixel electrode 206 are defined as W1 and L1, respectively. Here, there was studied the relationship between the ratio of the interelectrode space L1 of the pixel electrode 206 to the electrode width W1 of the pixel electrode 206 (L1/W1) and the reflectance of the reflection type liquid crystal device. The upper row of TABLE 1 shows the results in the case where the pixel electrode 206 is provided as the reflecting electrode, and the lower row shows the results in the case where the common electrode 207 is provided as the reflecting electrode.

TABLE 1

| | L1/W1 | | | | | | |
|---|---|---|---|---|---|---|---|
| | 0.001 | 0.005 | 0.051 | 0.104 | 0.201 | 0.505 | 1.102 |
| REFLECTANCE OF LIQUID CRYSTAL DEVICE (%) | 49.9 | 73.5 | 73.4 | 70.5 | 59.8 | 55.8 | 45.8 |

| | L1/W1 | | | | | |
|---|---|---|---|---|---|---|
| | 3.998 | 10.005 | 15.102 | 20.192 | 40.002 | 62.511 |
| REFLECTANCE OF LIQUID CRYSTAL DEVICE (%) | 59.9 | 77.3 | 85.6 | 73.5 | 62.3 | 55.1 |

According to the upper row of TABLE 1, when L1/W1 is equal to or greater than 0.005 and less than 0.2, realization of a liquid crystal device with reflectance equal to or greater than 60% is possible. The pixel electrodes 206 are formed so that the interelectrode space L1 is sufficiently narrower than the line width W1 of the pixel electrode 206. Therefore, most of incident light from the upper substrate 201 side could be reflected by the pixel electrode 206, which could inhibit a phenomenon of incident light entering around onto a section of the TFT element 210. It was found that the interelectrode space L1 of the pixel electrode 206 made excessively narrower than the line width W1 of the pixel electrode 206 causes the transverse electric field to be hardly generated between the pixel electrode 206 and the common electrode 207, so that, for L1/W1 being less than 0.005, reflectance of the reflection type liquid crystal device is reduced. In addition, it was found that, when L1/W1 is increased a certain amount, the transverse electric field produced between the pixel electrode 206 and the common electrode 207 is disturbed by an electric potential of adjacent pixel to cause reduction in reflectance of the reflection type liquid crystal device when L1/W1 is equal to or greater than 0.2.

It is preferable for the interelectrode space of the pixel electrodes 206 to be equal to or greater than 0.1 μm and less than 1 μm. The pixel electrodes 206 are formed so that the interelectrode space L1 thereof is narrow. Therefore, most of incident light from the upper substrate 201 side could be reflected by the pixel electrode 206, which could inhibit a phenomenon of incident light entering around onto the section of the TFT element 210 as much as possible. The interelectrode space L1 of the pixel electrodes 206 made excessively narrow causes the transverse electric field to be hardly generated between the pixel electrode 206 and the common electrode 207. Therefore, it is preferable that L1 is in the range from equal to or greater than 0.1 µm to less than 1 µm.

According to the lower row of TABLE 1, when L1/W1 is equal to or greater than 4 and less than 40, realization of a liquid crystal device with a reflectance equal to or more than 60% is possible. The pixel electrodes 206 are formed so that the interelectrode space L1 is sufficiently wider than the line width W1 of the pixel electrode 206. Therefore, most of incident light from the upper substrate 201 side could be reflected by the common electrode 207, which could inhibit a phenomenon of incident light entering around onto a section of the TFT elements 210. It was found that the interelectrode space L1 of the pixel electrode 206 made narrower than four times the line width W1 of the pixel electrode 206 increases influence of nonuniform electric field produced at the edge portion of the pixel electrode 206 to cause disturbance of the liquid crystal orientation, so that, for L1/W1 being less than 4, reflectance of the reflection type liquid crystal device is reduced. In addition, it was found that, when L1/W1 is increased a certain amount, the transverse electric field produced between the pixel electrode 206 and the common electrode 207 is disturbed by an electric potential of adjacent pixel to cause reduction in reflectance of the reflection type liquid crystal device when L1/W1 is equal to or greater than 40.

In the reflection type liquid crystal device shown in FIGS. 2(a) and 2(b), with the line width W1 of the pixel electrode 206 being fixed at 1 µm and the interelectrode space L1 of the pixel electrodes 206 changed, the reflectance of the reflection type liquid crystal device was studied. At this time, the pixel electrode 206 is provided as a transparent electrode and the common electrode 207 is provided as a reflecting electrode.

TABLE 2

| | L1 (µm) | | | | | | |
|---|---|---|---|---|---|---|---|
| | 5.1 | 7.9 | 10.2 | 14.9 | 25.1 | 30.8 | 42.5 |
| REFLECTANCE OF LIQUID CRYSTAL DEVICE (%) | 58.6 | 59.8 | 75.1 | 71.3 | 64.3 | 57.9 | 49.3 |

According to TABLE 2, when L1 is greater than 8 µm and equal to or less than 25 µm, it is possible to produce a liquid crystal device realizing a reflectance equal to or greater than 60%. It was found that L1 equal to or less than 8 µm increases influence of nonuniform electric field produced at the edge portion of the pixel electrode 206 to cause disturbance of the liquid crystal orientation, so that reflectance of the reflection type liquid crystal device is reduced. Conversely, for L1 becoming larger than 25 µm, it was found that the transverse electric field produced between the pixel electrode 206 and the common electrode 207 is disturbed by an electric potential of adjacent pixel to cause reduction in reflectance of the reflection type liquid crystal device.

Moreover, it is preferable to reduce the space between the pixels to be less than the interelectrode space L1. This makes the transverse electric field produced between the pixel electrode 206 and the common electrode 207 less susceptible to disturbance by an electric potential of adjacent pixel.

Fourth Embodiment

Figure 3:
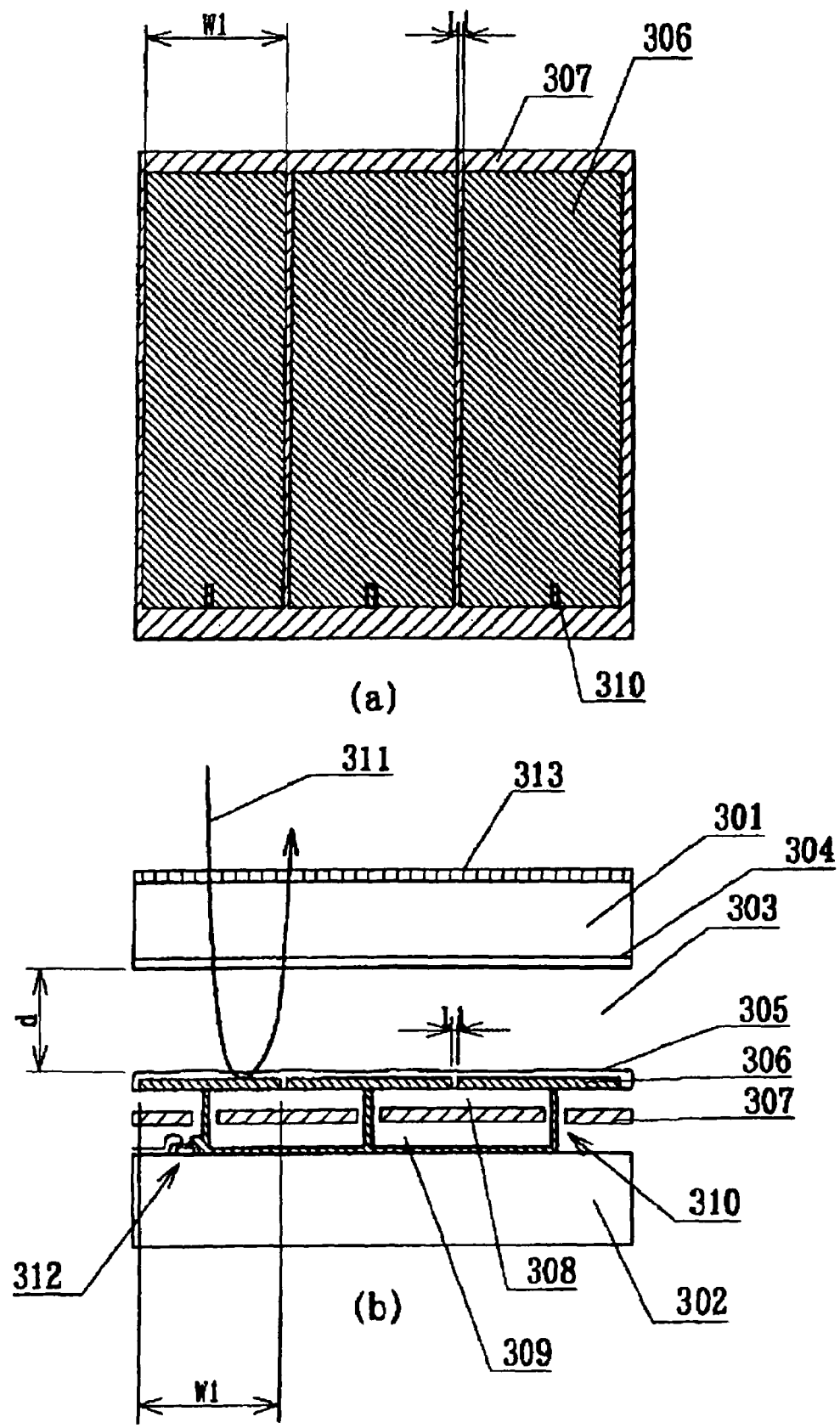
FIGS. 3(a) and 3(b) are schematics showing a structure of a fourth embodiment of a liquid crystal device according to the invention.

FIGS. 3(a) and 3(b) are schematics showing a structure of a fourth embodiment of a liquid crystal device according to the invention. FIG. 3 (a) is a front view of one pixel, and FIG. 3 (b) is a cross sectional view thereof. A structure is provided in which a liquid crystal layer 303 is disposed between two substrates, an upper substrate 301 and a lower substrate 302. The upper substrate 301 has an alignment layer 304 formed on the inner face thereof. On the inner side of the lower substrate 302, there are formed a scanning signal line, an image signal line and a TFT element 312, over which there are further formed a first insulation film 309, a common electrode 307, a second insulation film 308, a pixel electrode 306, and an alignment layer 305 in the order. In the common electrode 307, there are provided three openings (contact holes) 310, each for making the TFT element 312 and each of the pixel electrodes 306 to be in contact with each other. The pixel electrode 306 is a rectangular reflecting electrode with a width W1, and the common electrode 307 is a reflecting electrode formed substantially on a portion between the pixel electrodes 306, that is, on a layer under a portion with an interelectrode space L1 of the pixel electrodes. Each of the pixel electrode 306 and the common electrode 307 has a function of reflecting light 311 incident from the upper electrode 301 side. The liquid crystal layer 303 is controlled by an external driving circuit with an electric field produced due to an electric potential difference between the pixel electrode 306 and the common electrode 307. The reflection type liquid crystal device actively produces a transverse electric field, previously regarded as a cause of display defects, to control the liquid crystal. Thus, there is no display defect, such as disclination due to the transverse electric field that occurs in such cases as in a related art device in which a longitudinal electric field is applied between upper and lower substrates.

This enables realization of a bright and high-contrast reflection type liquid crystal display.

In the embodiment, the pixel electrode 306 is formed so as to also serve as a shading film for the TFT element 312. This makes it possible to reduce, minimize or eliminate faulty operation of the TFT element 312 due to light leakage.

In addition, in the embodiment, an ITO transparent electrode 313 of the ground potential is provided on a face of the upper substrate 301 which is different from the face on the liquid crystal layer 303. This realizes a liquid crystal device which is unaffected by static electricity.

Fifth Embodiment

Figure 4:
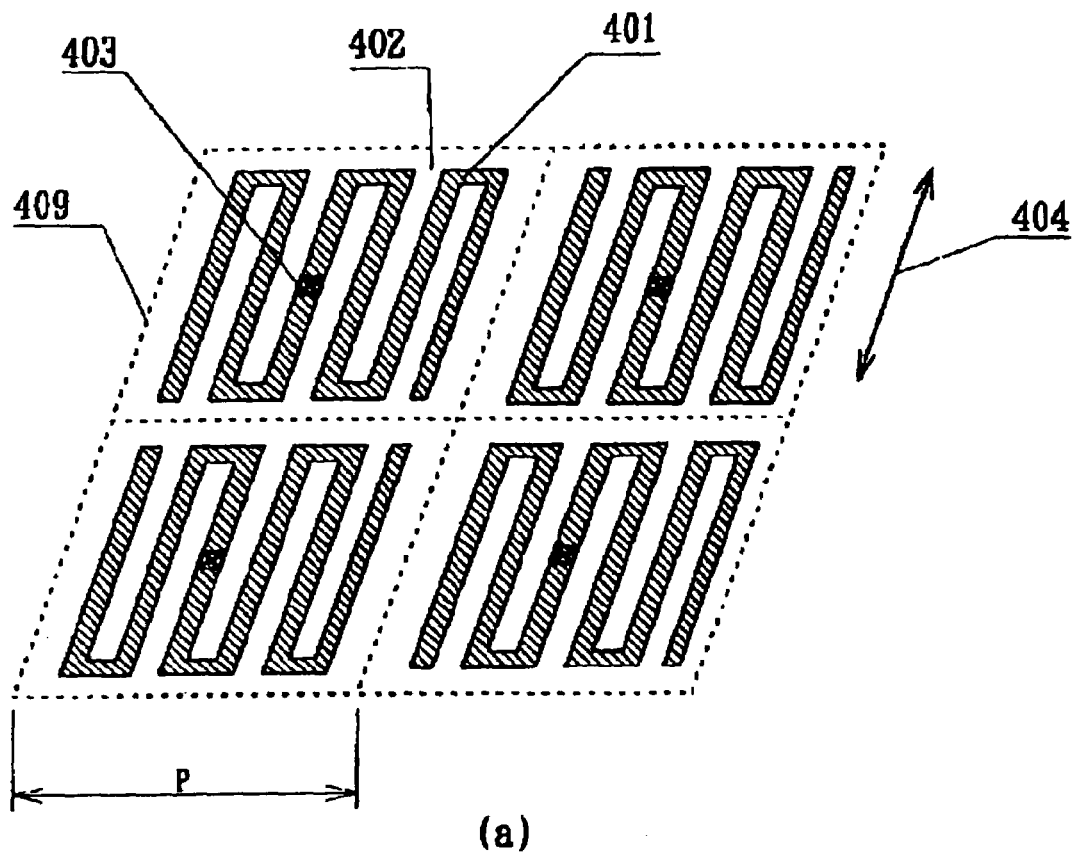
FIGS. 4(a) and 4(b) are schematics showing a shape of a pixel and a liquid crystal panel according to the invention.
Figure 4:
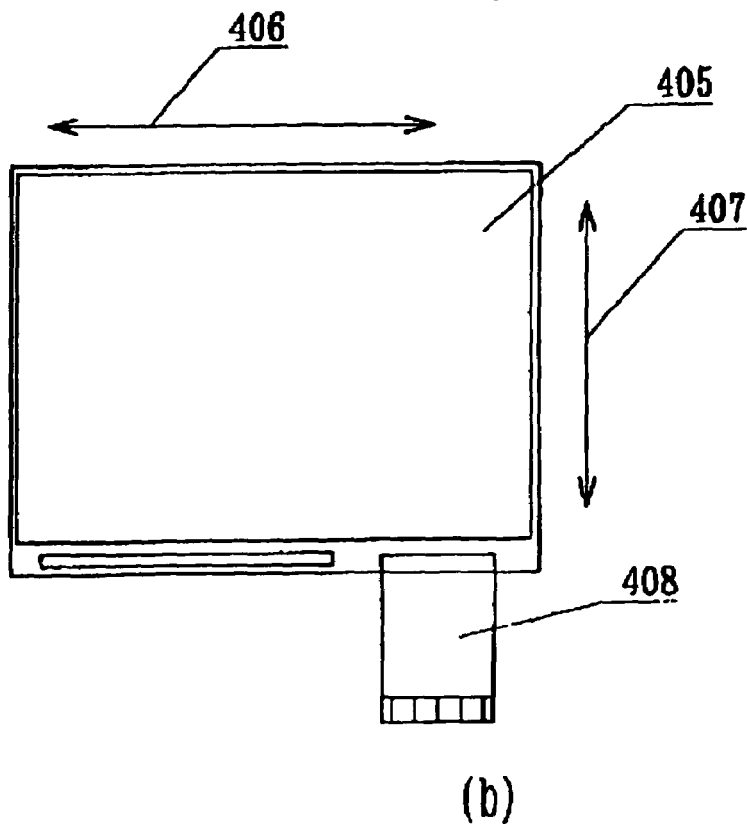

In a liquid crystal device with similar features to those in the first to the fourth embodiments, a shape of a pixel was provided as a parallelogram with each angle thereof being not a right angle as in FIG. 4 (a). On a common electrode 402, a pixel electrode 401 is formed with an insulation film interposed therebetween. The pixel electrode 401 is connected to a TFT element on a lower layer at a contact portion 403. One region 409 divided by dotted lines in FIG. 4 (a) represents one pixel (wherein a pitch of the one pixel is P). A longitudinal direction 404 of the liner pixel electrode 401 is neither in parallel with nor orthogonal to the vertical direction 407 and the longitudinal direction 406 of a liquid crystal panel 405 shown in FIG. 4 (b). In this way, initial orientation (orientation when no electric field is applied) of the liquid crystal can be provided in the vertical direction 407 or the longitudinal direction 406. In order to keep the liquid crystal in being tilted to the direction of the transverse electric field produced between the pixel electrode 401 and the common electrode 402, the initial orientation of the liquid crystal must be provided in the direction tilted at a specified angle to the longitudinal direction 404 of the pixel electrode 401 rather than in the direction in parallel with or at a right angle to the longitudinal direction 404.

This is to control the liquid crystal uniformly to the transverse electric field. On the reflection type liquid crystal device, polarized light can be incident which has a transmission axis in the vertical direction 407 or the longitudinal direction 406 of the liquid crystal panel. For example, a polarizing beam splitter (PBS) used in the projection type display structurally restricts the polarizing direction of outgoing polarized light normally in the vertical direction 407 or the longitudinal direction 406 of the liquid crystal panel. This makes the beam splitter very convenient for the liquid crystal device according to the invention. In addition, reference numeral 408 in FIG. 4 (b) denotes a connector tape to input signals to the liquid crystal panel 405.

Moreover, wherein an angle formed between the longitudinal direction of the linear pixel electrode 401 and the longitudinal direction 406 of the liquid crystal panel 405 is β, β is preferably 3 degrees$\leq \beta \leq$87 degrees. This is because, as explained above, the initial orientation of the liquid crystal can be set in the vertical direction 407 or the longitudinal direction 406 of the liquid crystal panel. Further, 5 degrees$\leq \beta \leq$25 degrees or 65 degrees$\leq \beta \leq$85 degrees is a more preferable range. The range allows the liquid crystal to be controlled at a lower voltage.

Sixth Embodiment

Figure 5:
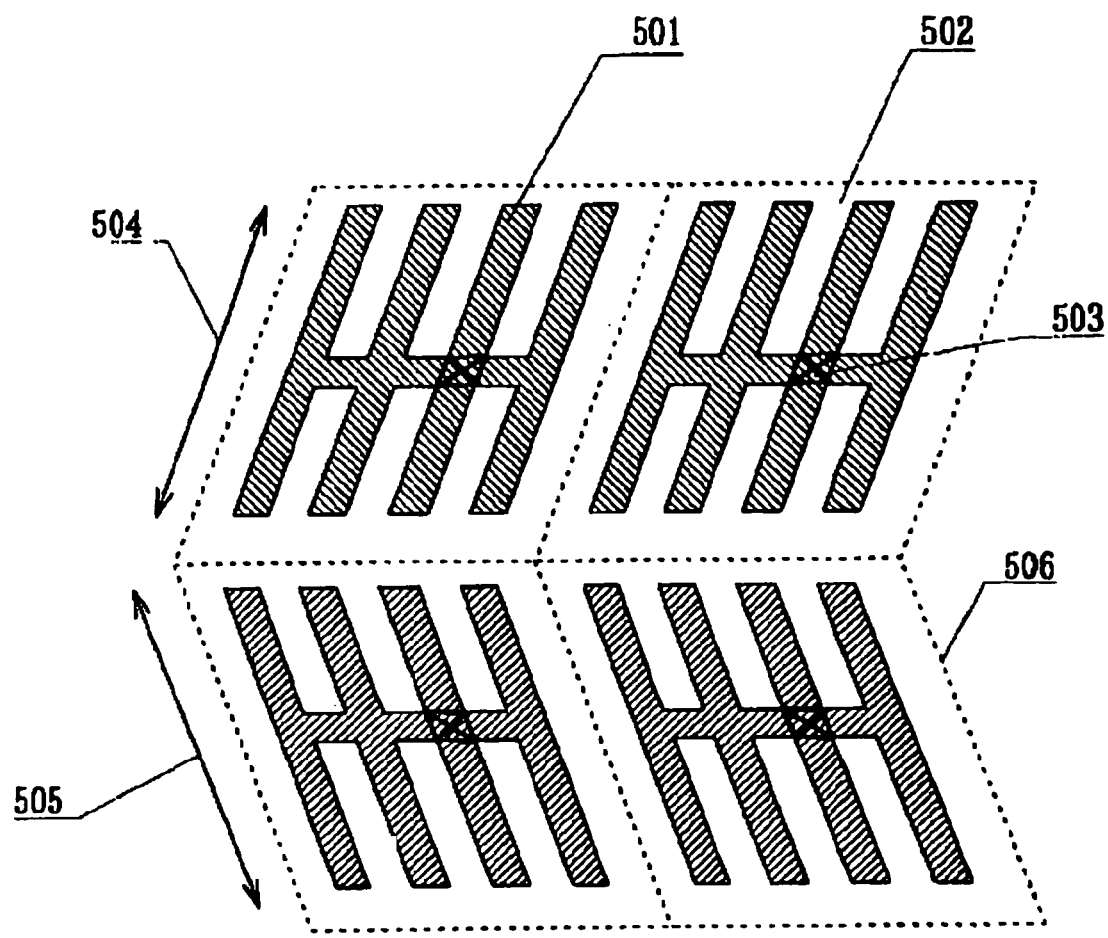
FIG. 5 is a schematic showing a shape of a pixel according to the invention.

In a liquid crystal device with similar features to those in the first to the fourth embodiments, a shape of a pixel was provided as a parallelogram with each angle thereof being not a right angle as in FIG. 5. Furthermore, a pixel neighboring under the above pixel was formed so that a longitudinal direction of a pixel electrode 501 is in nonparallel with the longitudinal direction of the pixel electrode 501 in the neighboring pixel above. On a common electrode 502, the pixel electrode 501 is formed with an insulation film interposed therebetween. The pixel electrode 501 is connected to a TFT element on a lower layer at a contact portion 503. One region 506 divided by dotted lines in FIG. 5 represents one pixel. Longitudinal directions 504 and 505 of the pixel electrodes 501 in FIG. 5 are in nonparallel with each other to provide the liquid crystal different orientation states between two pixels when an electric field is applied thereto. Thus, there can be realized a liquid crystal device with small dependence on viewing angle of liquid crystal. For example, when white is displayed on the whole screen of a liquid crystal display system, the liquid crystal is oriented in approximately the same way by a transverse electric field in any part. Observation of the approximately uniformly orientation state of the liquid crystal through a polarizing plate shows presence of viewing angle dependent characteristic like in a related art liquid crystal device. Thus, as in the liquid crystal device according to the invention, electrodes with longitudinal directions thereof made to be in nonparallel with each other in adjacent pixels provide orientation states (orientation directions) different from each other in respective pixels. This can realize a liquid crystal device with a small dependence on viewing angle.

Figure 6:
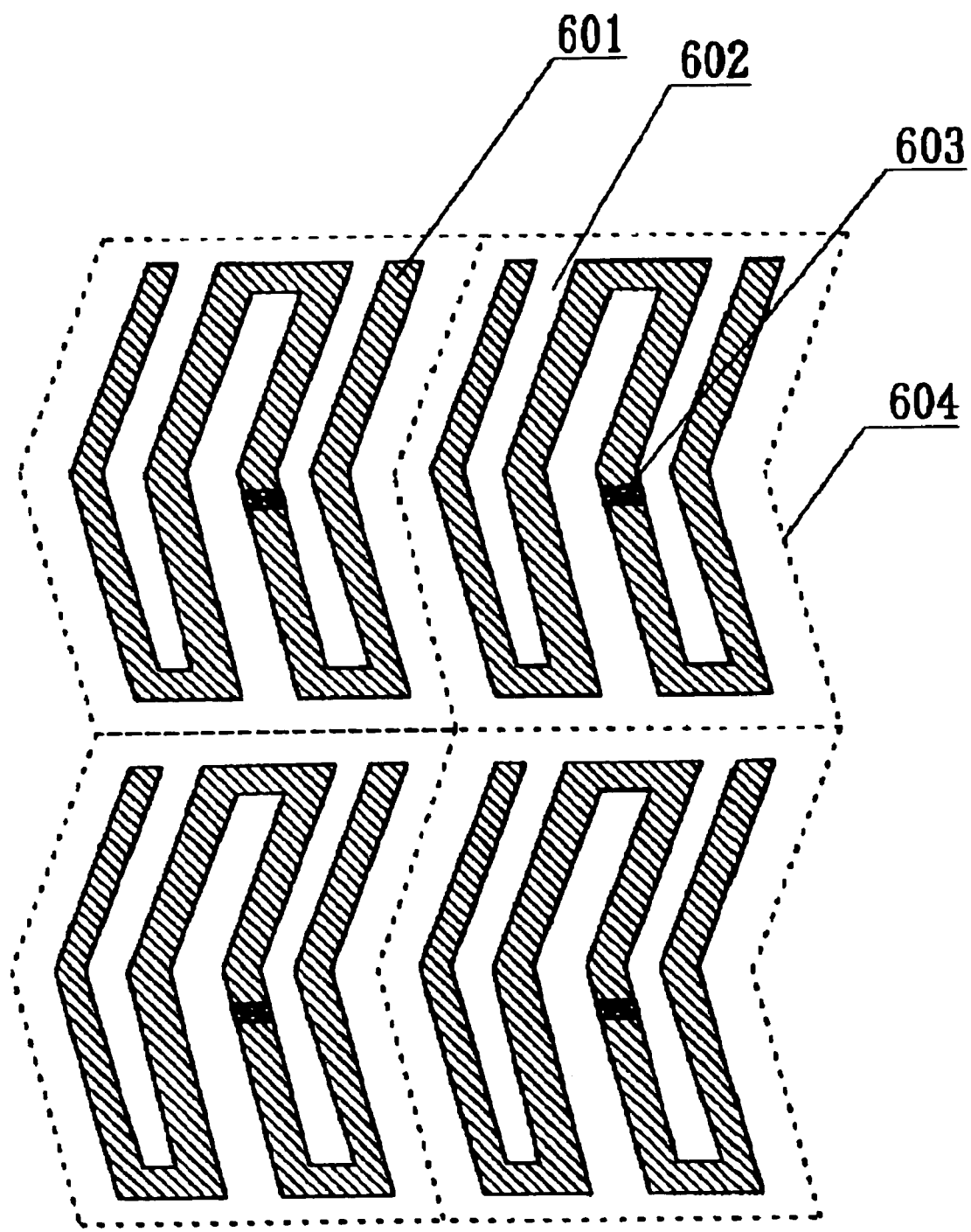
FIG. 6 is a schematic showing a shape of a pixel according to the invention.

Moreover, also with a pixel electrode 601 in one pixel as shown in FIG. 6 formed in a doglegged shape, there can be realized a liquid crystal device with small dependence on viewing angle of liquid crystal.

The pixel electrodes 601 of doglegged shape are formed on a common electrode 602 with an insulation film interposed therebetween. The pixel electrode 601 is connected to a TFT element on a lower layer at a contact portion 603.

One region 604 divided by dotted lines in FIG. 6 represents one pixel. By forming the electrode 601 in the one pixel in a doglegged shape, transverse electric fields in two directions are made to exist in the one pixel. This can produce two orientation states of liquid crystal in the one pixel to realize a liquid crystal device with small dependence on viewing angle of liquid crystal.

Seventh Embodiment

In the reflection type liquid crystal device shown in FIGS. 2(a) and 2(b), it is preferable to provide the thickness D1 of the first insulation film 209 as 0.01 µm$\leq$D1$\leq$5 µm. By selecting D1 in this range, the scanning line, the image signal line and the TFT element 210 can be prevented from short-circuiting with the common electrode 207. Moreover, unevenness of the surface of the first insulation film caused by the scanning line, the image signal line and the TFT element 210 can be reduced, minimized or eliminated. With a thickness D1 of the first insulation film 209 equal to or greater than 0.01 µm, an influence of electric potentials of the scanning line, the image signal line and the TFT element 210 on the common electrode 207 can be made almost negligible. For D1 exceeding 5 µm, the first insulation film 209 becomes so excessively thick that it becomes difficult to ensure levelness. In addition, a more preferable range for D1 is given as 1 µm$\leq$D1$\leq$3 µm.

Next, in the reflection type liquid crystal device shown in FIGS. 2(a) and 2(b), with the thickness D2 of the second insulation film 208 changed, the reflectance of the liquid crystal device was studied. The results are summarized in TABLE 3.

TABLE 3

| THICKNESS OF 2ND. INSULATION FILM D2 (µm) | 0.005 | 0.011 | 0.103 | 1.014 | 2.008 | 4.985 | 11.251 |
|---|---|---|---|---|---|---|---|
| REFLECTANCE OF LIQUID CRYSTAL DEVICE (%) | 58.4 | 61.3 | 82.4 | 82.1 | 80.1 | 64.5 | 53.3 |

With the thickness D2 of the second insulation film 208 provided as 0.01 µm$\leq$D2$\leq$5 µm, the reflectance equal to or greater than 60% can be ensured. Moreover, with D2 in this range, the pixel electrode 206 and the common electrode 207 can be prevented from short-circuiting. Moreover, the transverse electric field produced between the pixel electrode 206 and the common electrode 207 can be effectively applied to the liquid crystal layer 203. Furthermore, with D2 being in the range of 0.1 µm$\leq$D2$\leq$2 µm, realization of a reflection type liquid crystal device with the reflectance equal to or greater than 80% becomes possible.

Moreover, it is preferable that a space between pixels adjacent to each other is equal to or less than three times the thickness D2 of the second insulation film 208, more preferably, equal to or less than two times. This makes it possible to realize a reflection type liquid crystal device being less affected by an electric potential of adjacent pixel electrode.

Eighth Embodiment

The relationship between the product of the thickness d of the liquid crystal layer 103 in the reflection type liquid crystal device shown in FIGS. 1(a) and 1(b) and refractive index anisotropy Δn, Δn×d, and the reflectance of the liquid crystal device was studied. The Δn×d was changed from 0.05 to 0.41. The results are summarized in TABLE 4.

TABLE 4

| | Δn × d | | | | | | | |
|---|---|---|---|---|---|---|---|---|
| | 0.05 | 0.10 | 0.13 | 0.15 | 0.18 | 0.20 | 0.25 | 0.41 |
| REFLECTANCE OF LIQUID CRYSTAL DEVICE (%) | 40.3 | 62.1 | 75.8 | 82.3 | 73.1 | 59.8 | 55.3 | 54.1 |

As is apparent from TABLE 4, a reflection type liquid crystal device can be realized which has the reflectance equal to or greater than 60% when the product of the thickness d of the liquid crystal layer 103 and refractive index anisotropy Δn, Δn×d, is equal to or greater than 0.1 and less than 0.2.

Ninth Embodiment

In the reflection type liquid crystal device shown in FIGS. 1(a) and 1(b), wherein an angle which liquid crystal molecules in the liquid crystal layer 103 form with the substrate face (pretilt angle) is θp, θp is preferably 10 degrees<θp≦90 degrees. With the pretilt angle θp being within the range, display defects due to unnecessary longitudinal electric field component of electric field produced between the first electrode 106 and the second electrode 107 can be reduced, minimized or eliminated, which component is produced in the normal direction to the upper substrate 101 and the lower substrate 102. This is because the liquid crystal molecules are tilted in one direction by pretilt angle θp beforehand to cause no disorder in orientation even though a longitudinal electric field is produced.

Figure 7:
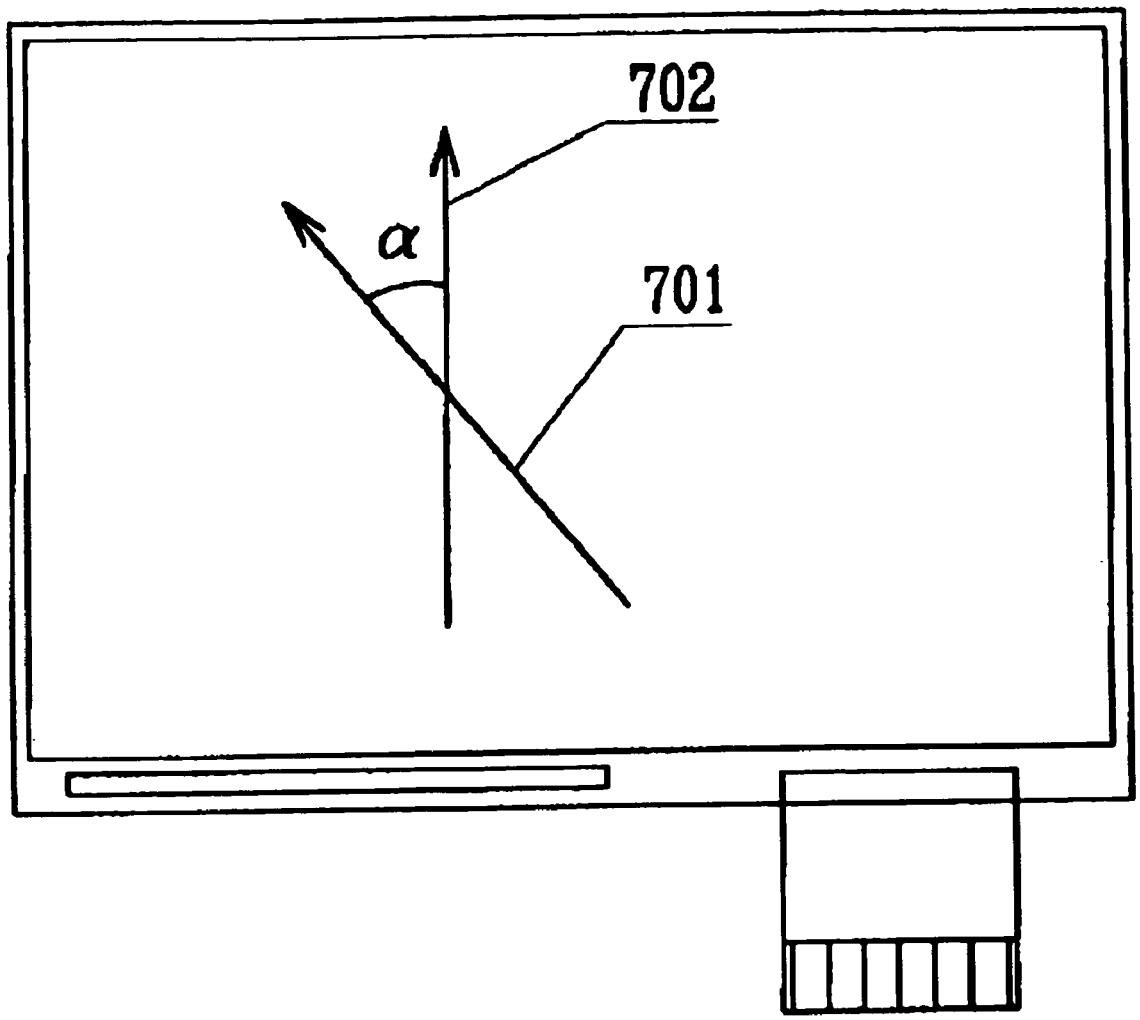
FIG. 7 is a schematic of a liquid crystal panel showing directions of orientation of liquid crystals.

FIG. 7 is a schematic of a liquid crystal panel with a pixel structure in FIGS. 1(a) and 1(b). An arrow 701 in FIG. 7 shows a direction of orientation of the liquid crystal on the upper substrate and an arrow 702 shows a direction of orientation of the liquid crystal on the lower substrate. An angle formed with directions of orientation on the upper and lower substrates is defined as α. The preferable range of α is equal to or greater than 0 degrees and less than 180 degrees. With thus set α, the liquid crystal in the liquid crystal layer can be twisted between the upper substrate and the lower substrate. This allows the liquid crystal to be effectively controlled by the transverse electric field produced between the first electrode and the second electrode. Moreover, by setting α to substantially α=0, realization of splay orientation becomes possible in which liquid crystal molecules positioned at the central part of the liquid crystal layer have a tilt angle of substantially zero degrees to the substrate surface.

Tenth Embodiment

In a related art TN (twisted nematic) type liquid crystal device, a pixel pitch P, an area of disclination display defects by transverse electric field and an effective aperture ratio as an occupying proportion of an area except the area of the display defects with respect to the pixel area were studied. The results are summarized in TABLE 5.

TABLE 5

| PIXEL PITCH P (μm) | 100 | 90 | 80 | 70 | 60 | 50 | 40 | 30 | 20 | 10 |
|---|---|---|---|---|---|---|---|---|---|---|
| PIXEL AREA (μm*μm) | 10000 | 8100 | 6400 | 4900 | 3600 | 2500 | 1600 | 900 | 400 | 100 |
| AREA OF DISCLINATION | 424.3 | 381.3 | 339.4 | 297.0 | 254.6 | 212.1 | 169.7 | 127.3 | 84.9 | 42.4 |
| EFFECTIVE APERTURE RATIO (%) | 95.8 | 95.3 | 94.7 | 93.9 | 92.9 | 91.5 | 89.4 | 85.9 | 78.8 | 57.6 |

From the results presented in TABLE 5, it is known that the effective aperture ratio, shown as a proportion of effective area where a display is not affected in the displaying region by disclination lines when the disclination lines are produced, becomes less than 85% for the pixel pitch equal to or less than 30 μm in a related art liquid crystal device. Thus, it is considered that the invention is effective for pixel pitches in the range equal to or less than 30 μm, particularly for pixel pitches far less than 30 μm. Specifically, the effective aperture ratio is equal to or less than 80% for the pixel pitch of 20 μm and is equal to or less than 60% for the pixel pitch equal to or less than 10 μm. Hence, it was found that a liquid crystal mode of a transverse electric field such as that in the present invention is preferably employed in a liquid crystal device with pixel pitches equal to or less than 30 μm. The liquid crystal device according to the invention exhibits no reduction in effective aperture ratio even for pixel pitches equal to or less than 30 μm to allow realization of a bright reflection type display.

Eleventh Embodiment

In the reflection type liquid crystal device shown in FIGS. 2(a) and 2(b), the interelectrode space of the pixel electrode 206 and the thickness of the pixel electrodes 206 are defined as L1 and D2, respectively. Here, there was studied the relationship between the ratio of the thickness D2 of the pixel electrode 206 to the interelectrode space L1 of the pixel electrode 206 (L1/D2), and the reflectance and a contrast ratio of the reflection type liquid crystal device. The experiment was performed with the line width W1 of the pixel electrode 206 held constant as 1 μm and the interelectrode space L1 of the pixel electrode 206 held constant as 4 μm. The reflectance is the brightness when 5 V is applied between the pixel electrode 206 and the common electrode 207, and the contrast ratio is a ratio of brightness (reflectance) when 5 V is applied and that when no voltage is applied.

TABLE 6

| | L1/D2 | | | | | |
|---|---|---|---|---|---|---|
| | 1.1 | 3.9 | 5.0 | 15.3 | 30.1 | 40.5 |
| REFLECTANCE (%) | 40.9 | 69.1 | 80.5 | 85.1 | 80.0 | 67.6 |
| CONTRAST RATIO | 205 | 346 | 403 | 426 | 400 | 338 |

W1 = 1 μm CONSTANT
L1 = 4 μm CONSTANT

According to TABLE 6, when L1/D2 is equal to or greater than 5 and equal to or less than 30, a liquid crystal device can be realized with reflectance of equal to or greater than 80%. Moreover, contrast ratio of equal to or greater than 400 can be obtained. From the foregoing, by setting L1/D2 to $5 \leq L1/D2 \leq 30$, a bright and high-contrast reflection display can be realized.

Twelfth Embodiment

Figure 8:
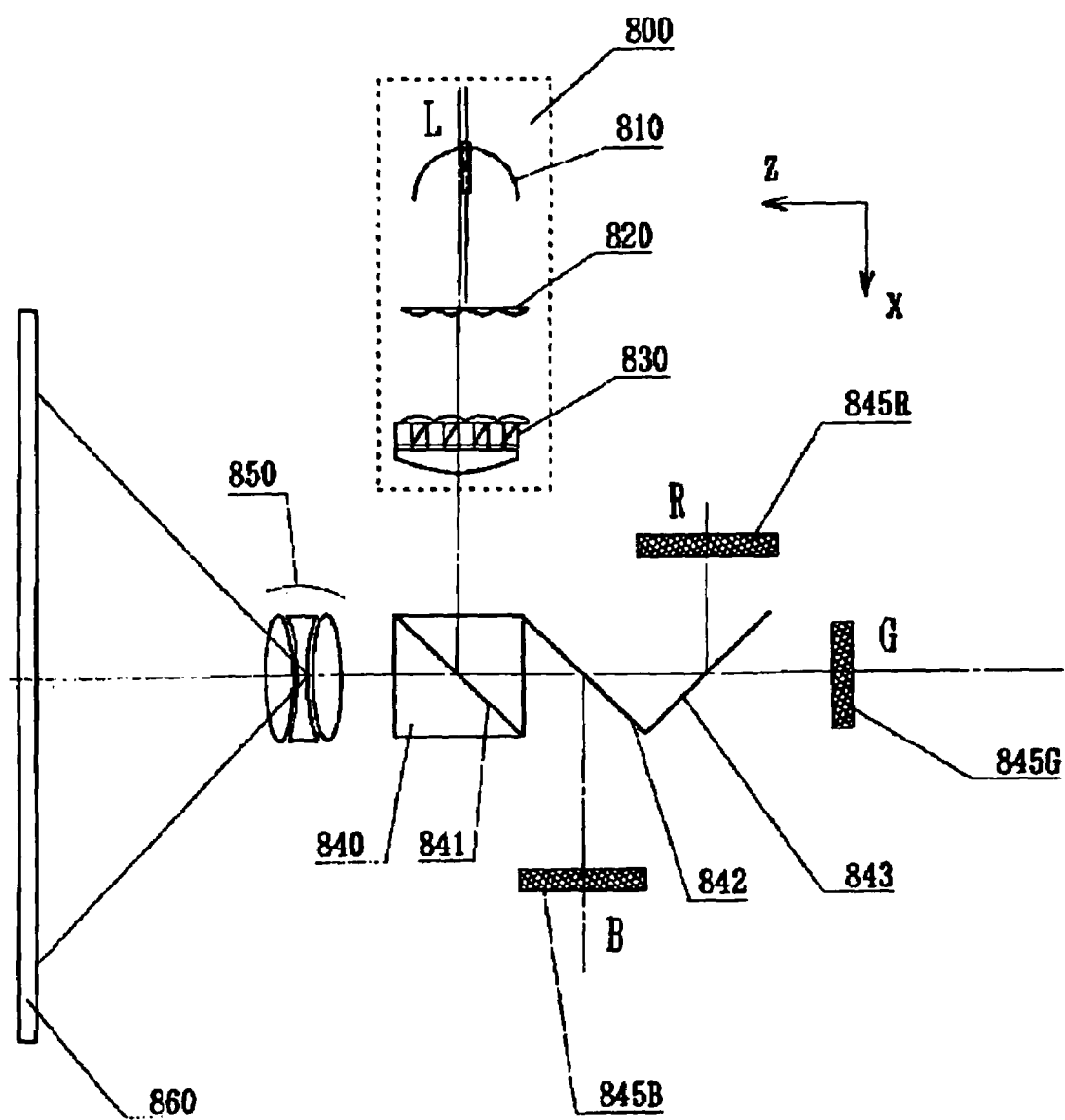
FIG. 8 is a schematic showing a configuration of a projection type display system (liquid crystal projector) as an application example of using the liquid crystal device according to the invention.

In FIG. 8, an illustration is presented of a configuration of a projection type display system (liquid crystal projector) as an example of application in which the liquid crystal device according to the embodiment is used. FIG. 8 is a cross sectional view of the liquid crystal projector along an XY plane containing the center of a projection optical system 850.

The liquid crystal projector according to the embodiment includes a polarized light lighting system 800 and the projection optical system 850. The polarized light lighting system 800 roughly includes a light source section 810, an integrator lens 820, and a polarizing converting element 830, which are arranged along a system optical axis L. The projection optical system 850 includes a polarization beam splitter 840 to reflect an S-polarized light beam projected from the polarized light lighting system 800 by an S-polarized light beam reflecting face 841, a dichroic mirror 842 to separate blue light (B) component of the light reflected by the S-polarized light beam reflecting face 841 of the polarization beam splitter 840, a reflection type liquid crystal light valve 845B to modulate the separated blue light (B), a dichroic mirror 843 to separate red light (R) component of the light beam after the blue light (B) having been separated, a reflection type liquid crystal light valve 845R to modulate the separated red light (R), a reflection type liquid crystal light valve 845G to modulate the remaining green light (G) passing through the dichroic mirror 843, and a projection lens to superimpose light beams modulated by the three reflection type liquid crystal light valves 845R, 845G and 845B by the dichroic mirrors 843 and 842, and the polarization beam splitter 840, respectively, and to project the superimposed light beam on a screen 860. For each of the above three reflection type liquid crystal light valves 845R, 845G and 845B, there is used any one of the liquid crystal display systems (liquid crystal panels) explained in the foregoing embodiments.

A randomly polarized light beam projected from the light source section 810 is divided into a plurality of intermediate light beams by the integrator lens 820. The intermediate beams are thereafter converted into one kind of polarized light beam (S-polarized light beam) with a polarized light beam substantially aligned by the polarization converting element 830 having a second integrator lens on a side of light incidence. Then, the converted polarized light reaches the polarization beam splitter 840. The S-polarized light beam projected from the polarization converting element 830 is reflected by the S-polarized light beam reflecting face 841 of the polarization beam splitter 840. Of the reflected light beam, a light beam of the blue light (B) is reflected by a blue light reflecting layer of the dichroic mirror 842 to be modulated by the reflection type liquid crystal light valve 845B. Moreover, of the light beam passing through the blue light reflecting layer of the dichroic mirror 842, a light beam of the red light (R) is reflected by a red light reflecting layer of the dichroic mirror 843 to be modulated by the reflection type liquid crystal light valve 845R. A light beam of the green light (G) passing through the red light reflecting layer of the dichroic mirror 843 is modulated by the reflection type liquid crystal light valve 845G.

In the way as described above, colored light is modulated by the reflection type liquid crystal light valves 845R, 845G and 845B.

Of the colored light reflected from the pixel of the liquid crystal panel, an S-polarized component does not pass through the polarization beam splitter 840 reflecting S-polarized light, whereas a P-polarized component does. By the light passing through the polarization beam splitter 840, an image is formed.

The reflection type liquid crystal panel, compared with an active matrix type liquid crystal panel with a TFT array formed on a glass substrate, is provided with pixels formed by making use of semiconductor technology to make it possible to form a larger number of pixels for more reduced panel size. Therefore, the panel can project a highly fine image, and along with this, contributes to downsizing of a projector itself. In addition, the reflection type liquid crystal panel according to the invention is less susceptible to producing display defects due to the transverse electric field to provide high reflectance even though resolution is enhanced. Therefore, a bright projection display can be obtained.

Thirteenth Embodiment

Figure 9:
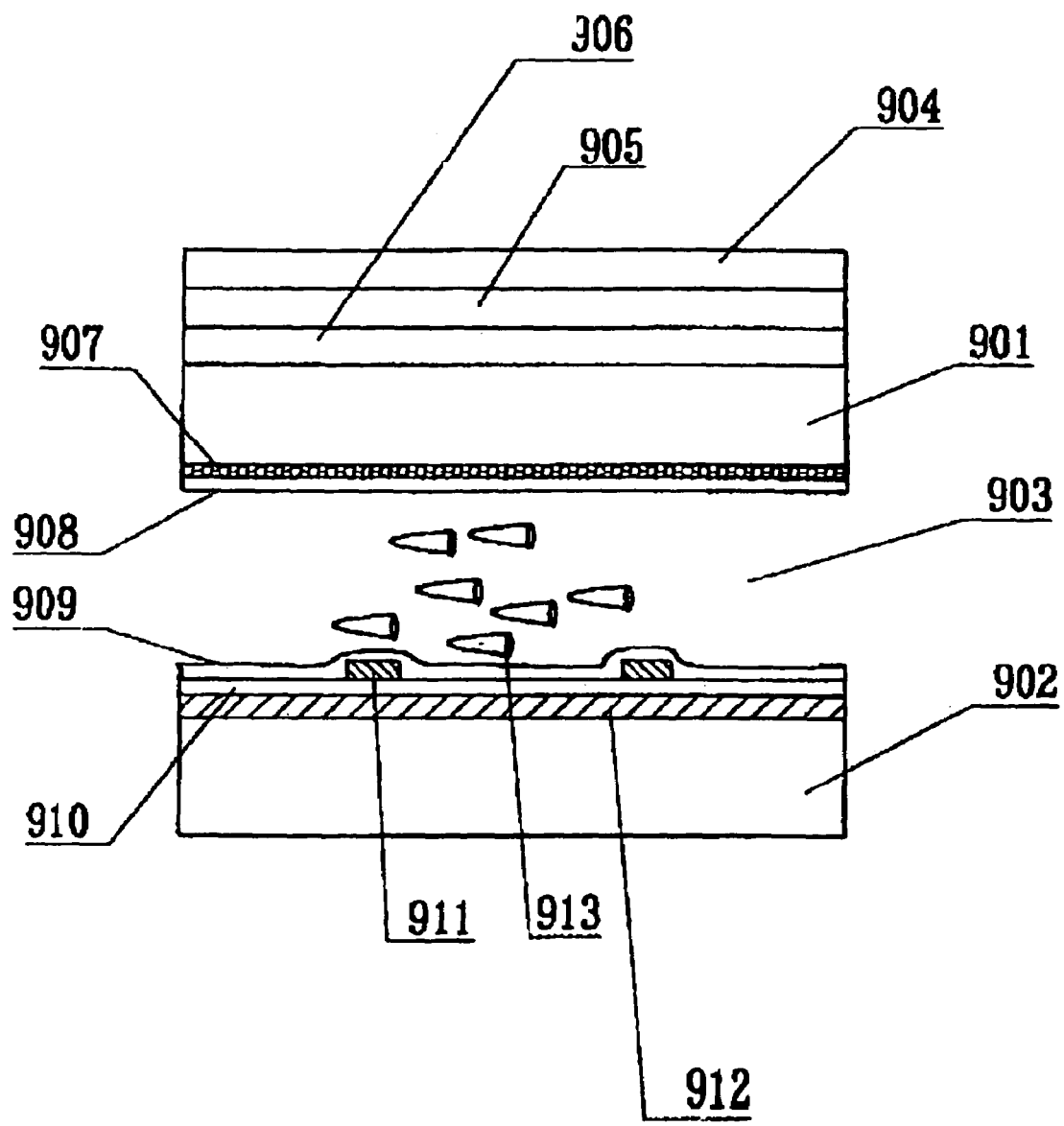
FIG. 9 is a schematic showing a structure of a thirteenth embodiment of a liquid crystal device according to the invention.

FIG. 9 is a schematic view showing a structure of a thirteenth embodiment of a liquid crystal device according to the invention. A structure is provided in which a liquid crystal layer 903 is disposed between two substrates, an upper substrate 901 and a lower substrate 902.

The upper substrate 901 has a color filter 907 and an alignment layer 908 formed in the order on the inner face thereof. On the outer side face of the upper substrate 901, there are formed two retardation films 906 and 905, and a polarizing plate 904 in order. On the inner side of the lower substrate 902, there are formed a second electrode 912, an insulation film 910 including SiOx, a first electrode 911 and an alignment layer 909. The first electrode 911 is a linear transparent electrode and the second electrode 912 is a rectangular reflecting electrode. The second electrode 912 reflects light incident from the upper substrate 901 side. The liquid crystal layer 903 is controlled by an external driving circuit with an electric field produced due to an electric potential difference between the first electrode 911 and the second electrode 912. The reflection type liquid crystal device actively produces a transverse electric field, previously regarded as a cause of display defects, to control the liquid crystal. Thus, there is no display defect, such as disclination due to the transverse electric field that occurs in such cases as in conventional devices in which a longitudinal electric field is applied between upper and lower substrates. This makes realization of a bright and high-contrast reflection type colored liquid crystal display possible.

Subsequent to this, specific examples of electronic equipment will be explained which is provided with the above-described reflection type colored liquid crystal display system.

Figure 10:
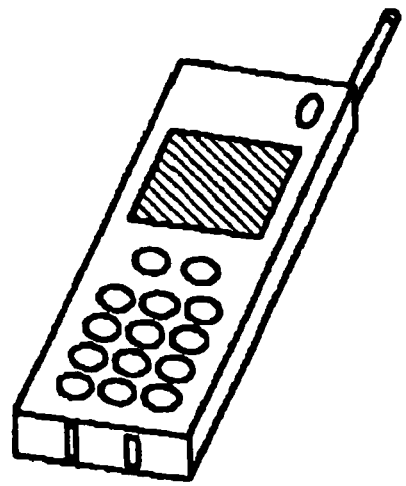
FIGS. 10(a)–10(c) are schematic perspective views of electronic equipment mounting the liquid crystal device according to the invention.
Figure 10:
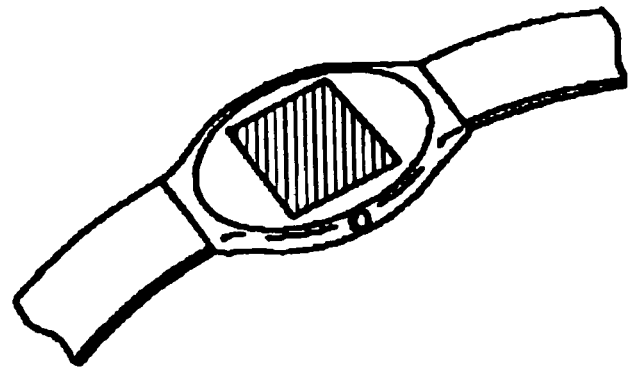
Figure 10:
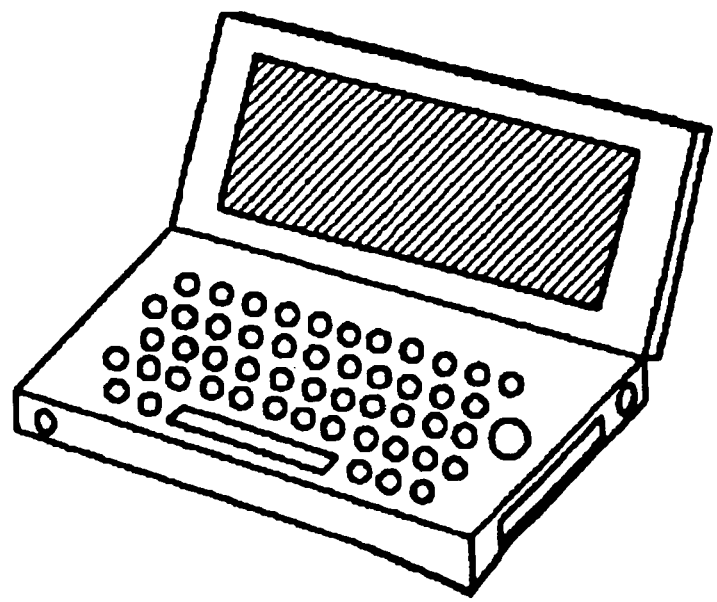

FIG. 10 (a) is a perspective view showing an example of a cellular phone.

FIG. 10 (b) is a perspective view showing an example of electronic equipment of a wrist watch type.

FIG. 10 (c) is a perspective view showing an example of a portable information processing unit such as a word processor or a personal computer.

The electronic equipment shown in each of FIGS. 10 (a) to 10(c) is provided with the above-described reflection type colored liquid crystal display and has any of the characteristics of the previously explained embodiments. Thus, a highly fine display can be obtained with high contrast ratio by the use of any of the liquid crystal display.

Realization of a reflection type liquid crystal device, a projection type display and electronic equipment becomes possible, in which display defects caused by disclination are reduced, minimized or prevented from being produced for a highly fine liquid crystal display with a space between pixels made to become narrow to make it possible to provide a high-contrast and bright display.

What is claimed is:

1. A liquid crystal device, comprising:
 a first substrate;
 a second substrate;
 a liquid crystal between the first substrate and the second substrate;
 a signal line located at a first-substrate side of the liquid crystal, the signal line supplying one of a scanning signal and an image signal;
 an active element located at the first-substrate side of the liquid crystal and electrically connected to the signal line;
 a first insulation film;
 a second insulation film;
 a first electrode located at the first-substrate side of the liquid crystal, the first electrode being formed in each pixels, the first electrode including a plurality of linear portions which are arranged in parallel, and which are electrically connected to each other:
 a second electrode located at the first-substrate side of the liquid crystal in a different layer than the first electrode with the second insulation film being disposed between the first electrode and the second electrode, the second electrode being separated from the first electrode by the second insulation film, the second electrode being separated from the signal line and the active element by the first insulation film, the liquid crystal being controlled by an electric field generated between the pair of electrodes, the second electrode having an opening, the first electrode being electrically connected to the active element through the opening of the second electrode.

2. The liquid crystal device as claimed in claim 1, wherein the second electrode has a plurality of the openings in each pixel, a plurality of the linear portions of the first electrode being connected to the same single active element through each of the openings.

3. The liquid crystal device as claimed in claim 1, wherein the first insulation film having a leveling function so that the second electrode provides a mirror surface.

4. The liquid crystal device as claimed in claim 1, wherein the first insulation film has a thickness D1 that satisfies the equation $0.01\ \mu m \leq D1 \leq 5\ \mu m$.

5. The liquid crystal device as claimed in claim 1, wherein the second electrode is formed substantially over all of a display area of the liquid crystal device.

6. The liquid crystal device as claimed in claim 1, wherein at least one of the first electrode and the second electrode operating as a reflecting electrode that reflects incident light coming from a direction of the second substrate.

* * * * *